United States Patent
Verran et al.

(10) Patent No.: US 12,427,734 B2
(45) Date of Patent: Sep. 30, 2025

(54) TENSIONED TOOLING ASSEMBLY FOR A THERMOPLASTIC COMPOSITE STAMP FORMING PROCESS, AND TENSIONED TOOLING SYSTEM AND METHOD OF USING THE SAME

(71) Applicant: The Boeing Company, Arlington, VA (US)

(72) Inventors: Zachary T. Verran, Ladson, SC (US); Greg M. Reyneke, Everett, WA (US); Gregory J. Hickman, Ladson, SC (US)

(73) Assignee: The Boeing Company, Arlington, VA (US)

( * ) Notice: Subject to any disclaimer, the term of this patent is extended or adjusted under 35 U.S.C. 154(b) by 25 days.

(21) Appl. No.: 18/477,355

(22) Filed: Sep. 28, 2023

(65) Prior Publication Data
US 2025/0108572 A1 Apr. 3, 2025

(51) Int. Cl.
*B29C 70/56* (2006.01)
*B29C 70/34* (2006.01)
*B29L 31/30* (2006.01)

(52) U.S. Cl.
CPC ............ *B29C 70/56* (2013.01); *B29C 70/345* (2013.01); *B29L 2031/3076* (2013.01)

(58) Field of Classification Search
CPC ........ B29C 51/30; B29C 70/56; B29C 70/345
See application file for complete search history.

(56) References Cited

U.S. PATENT DOCUMENTS

| | | | |
|---|---|---|---|
| 8,795,567 B2* | 8/2014 | Bland | B29C 70/549 264/258 |
| 9,067,371 B2* | 6/2015 | Williams | B29C 70/56 |
| 11,312,467 B2* | 4/2022 | Yadav | B64C 1/064 |

* cited by examiner

*Primary Examiner* — Michael A Tolin
*Assistant Examiner* — Hana C Page

(57) ABSTRACT

There is provided a tensioned tooling assembly for a thermoplastic composite stamp forming process. The tensioned tooling assembly includes a bottom tool having a bottom tool outer flange with a bottom end, a bottom tool outer radius, and a bottom tool outer curved surface. The bottom tool includes a plurality of tensioning protruding portions spaced apart on, and outwardly extending from, the bottom tool outer curved surface. Each tensioning protruding portion defines an angle formed from the bottom tool outer radius to the bottom end. The tensioned tooling assembly further includes a top tool having a top tool outer flange with a bottom end, a top tool outer radius, and a top tool outer curved surface. The top tool includes a plurality of corresponding portions formed in, and spaced apart on, the top tool outer curved surface, the plurality of corresponding portions corresponding to the plurality of tensioning protruding portions.

20 Claims, 17 Drawing Sheets

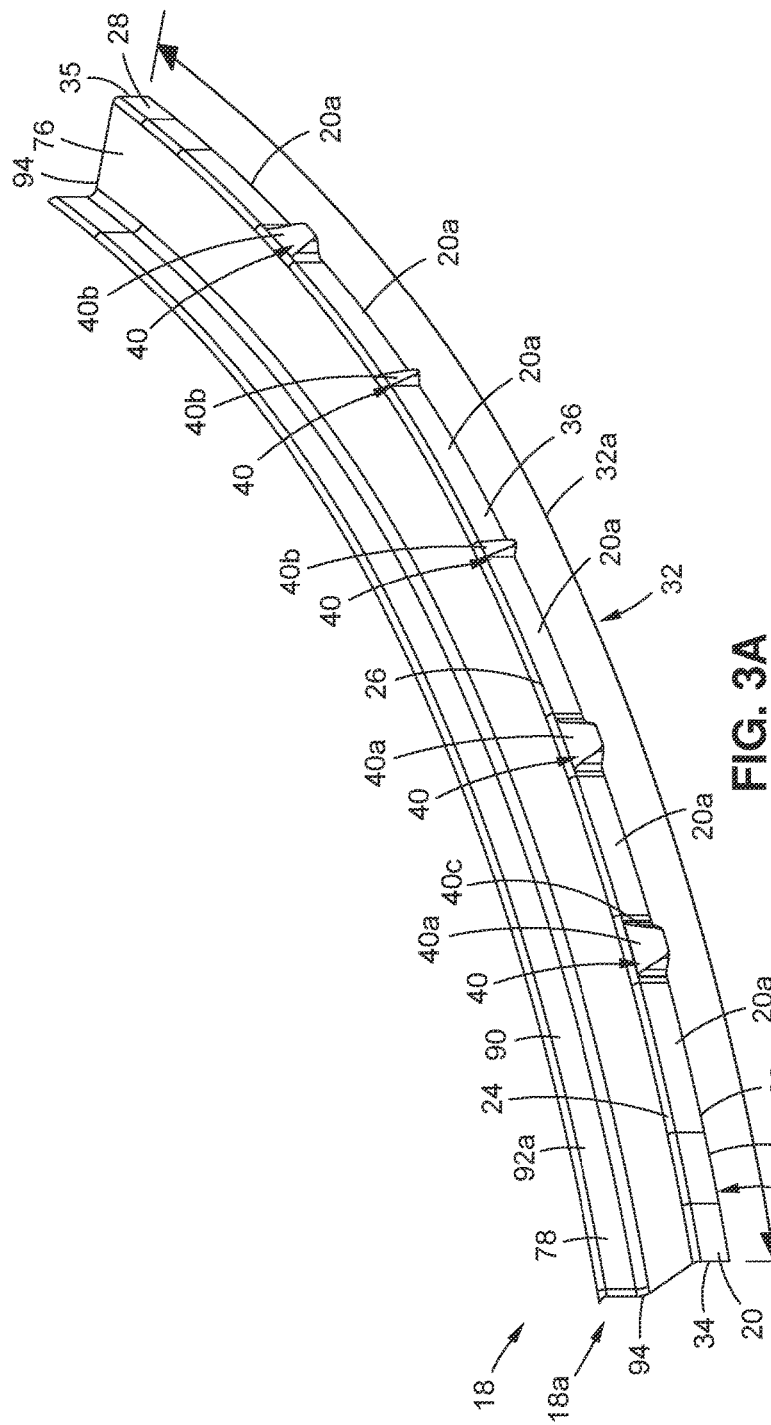
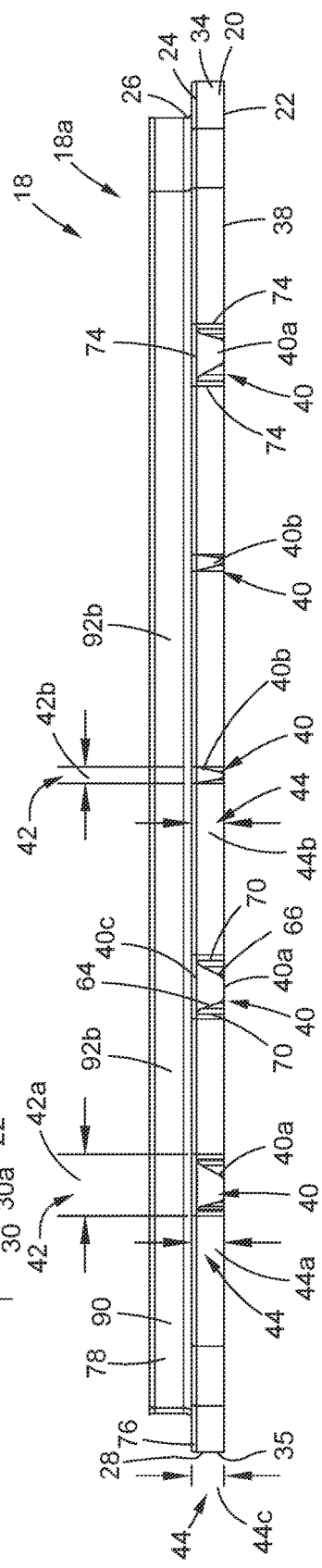
FIG. 3A
FIG. 3B

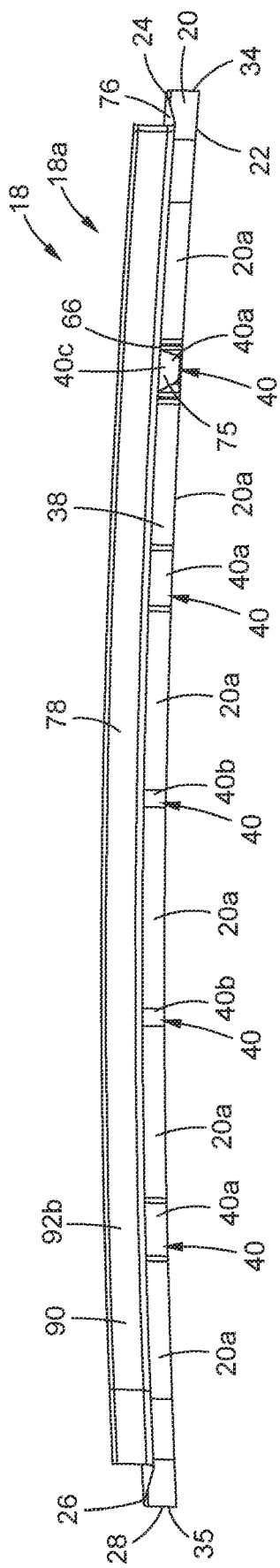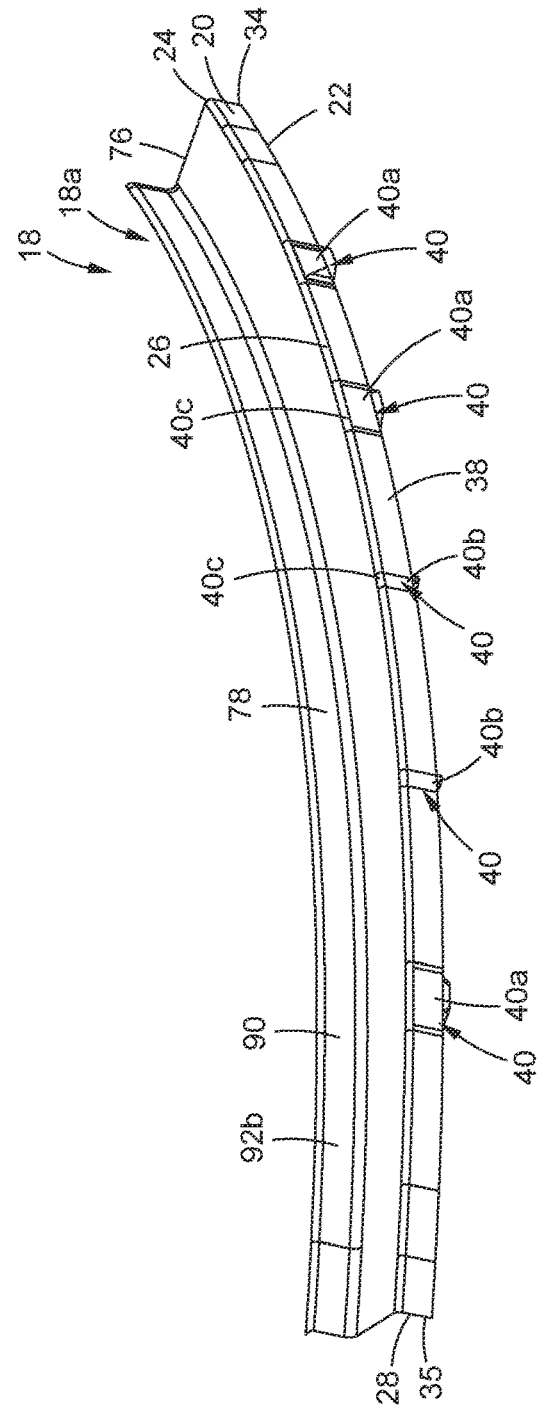

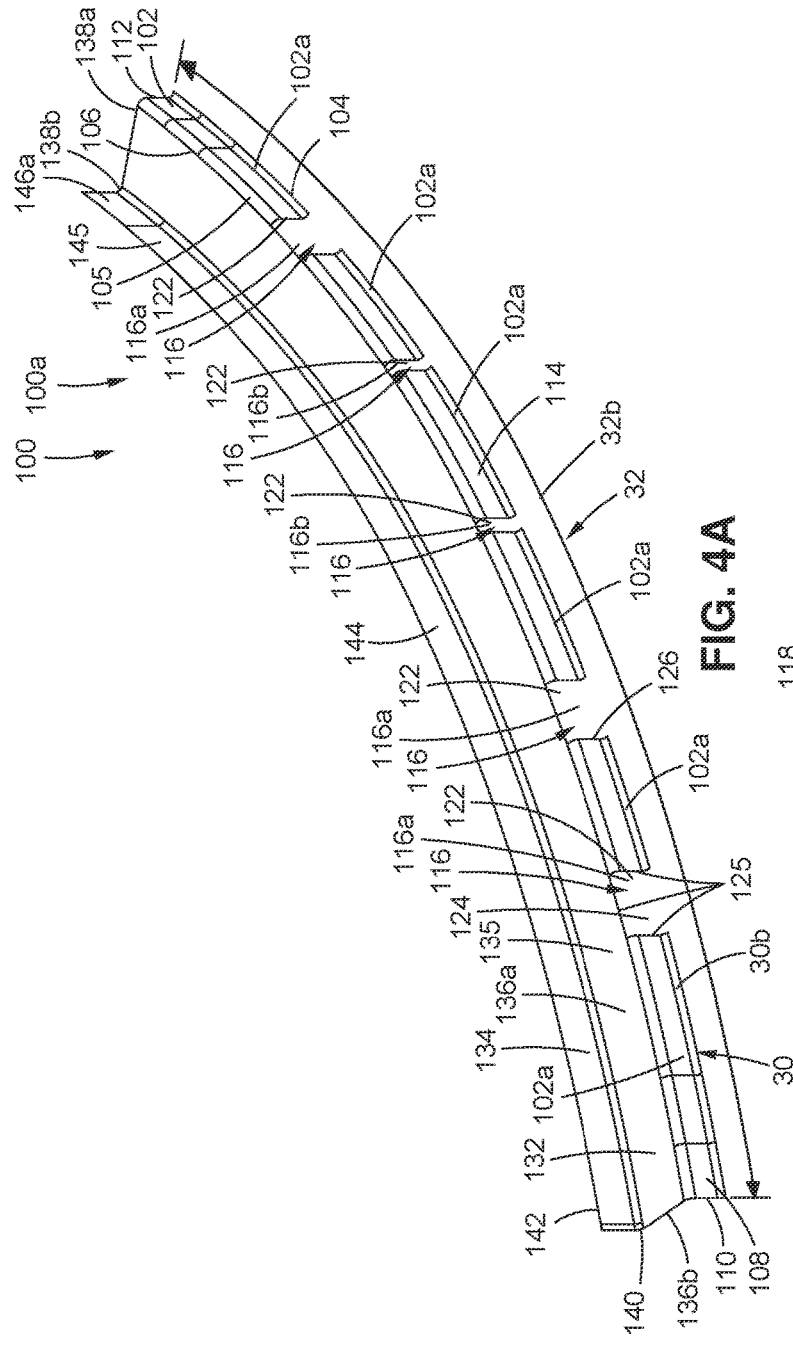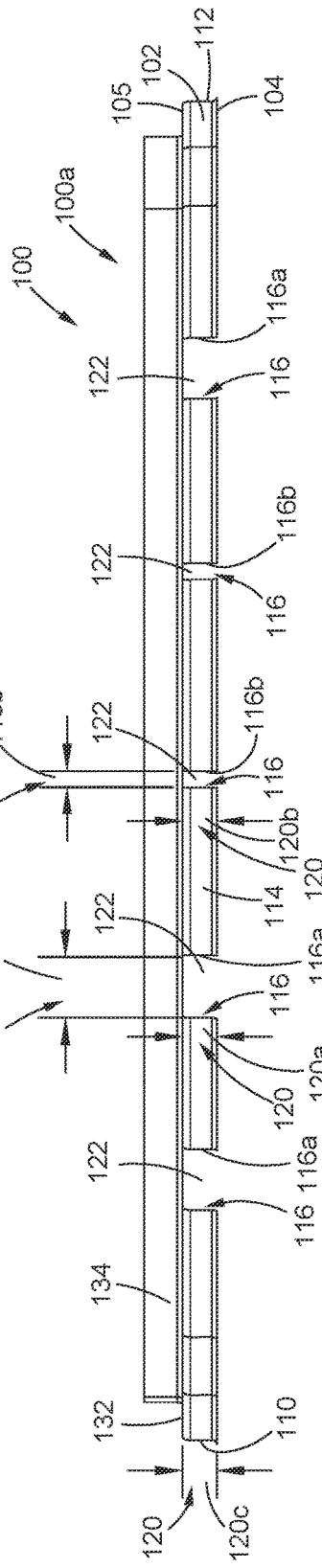
FIG. 4A
FIG. 4B

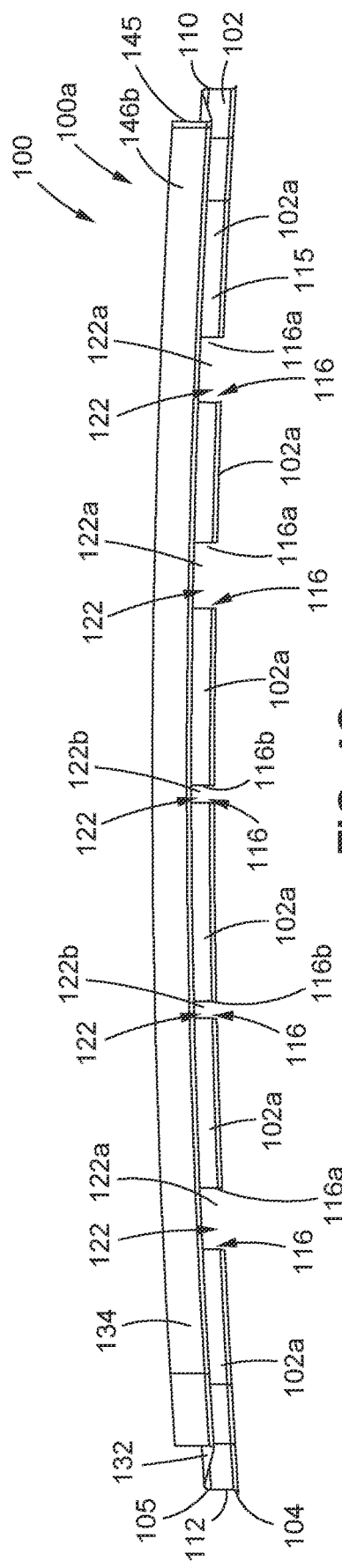
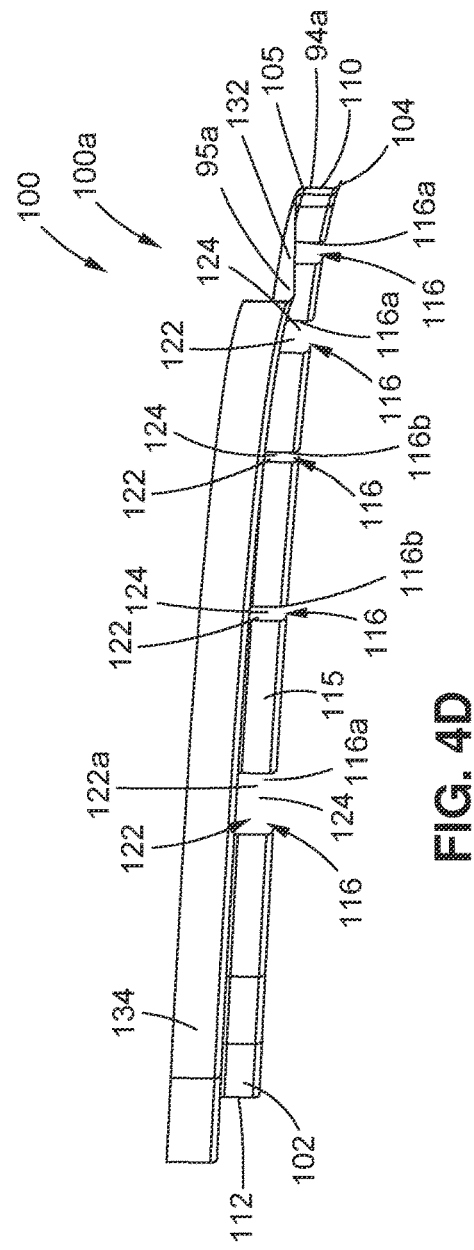
FIG. 4C
FIG. 4D

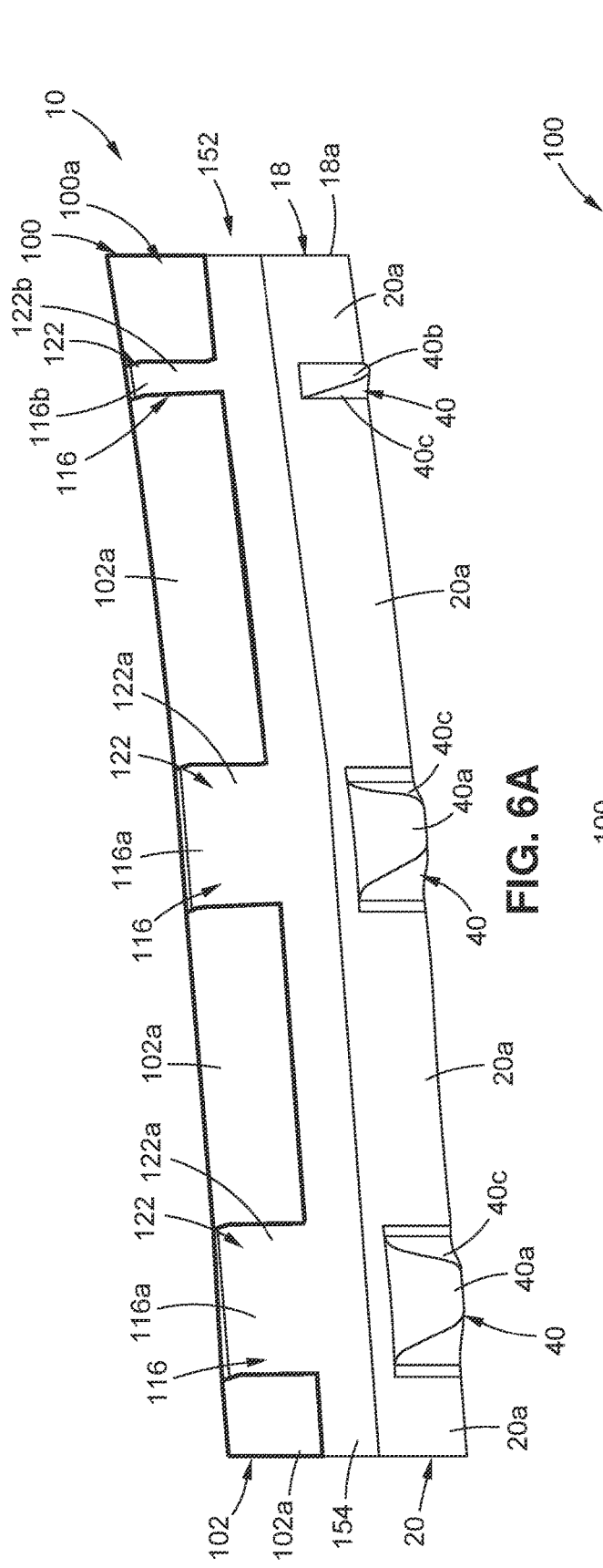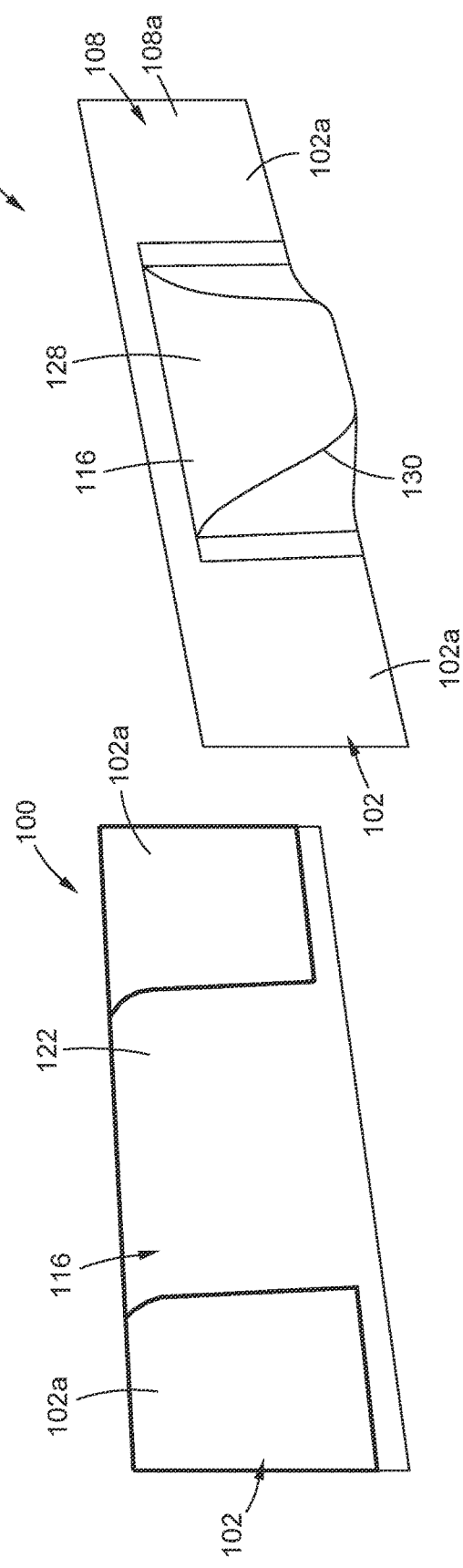

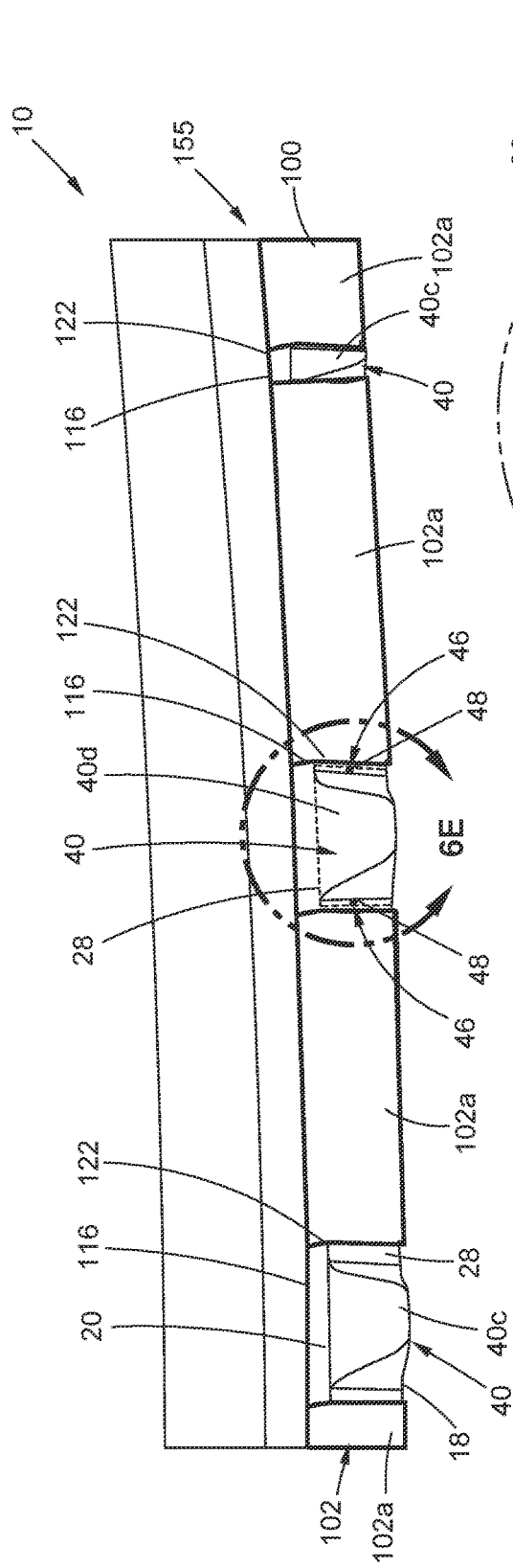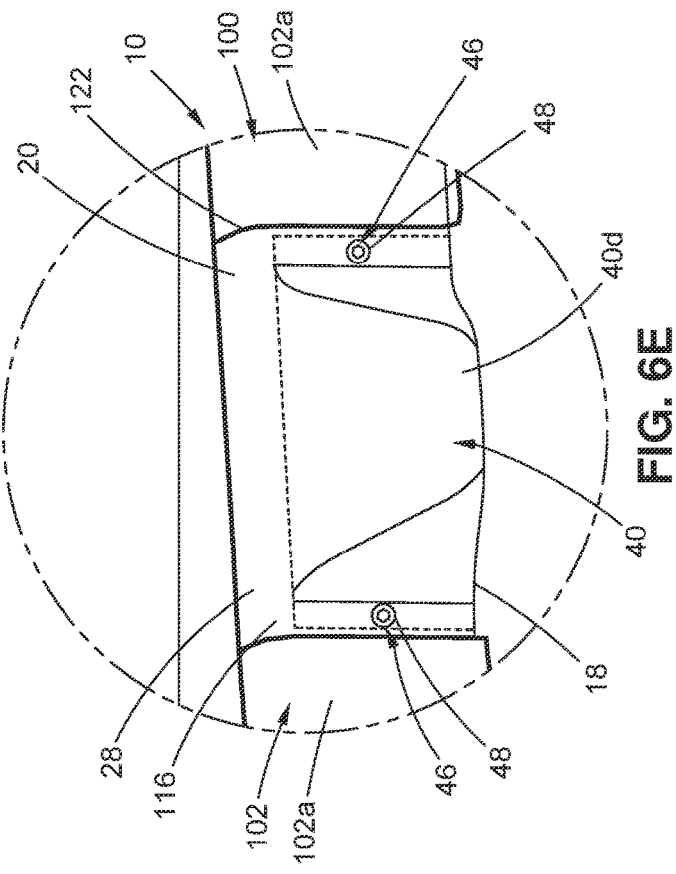
FIG. 6D
FIG. 6E

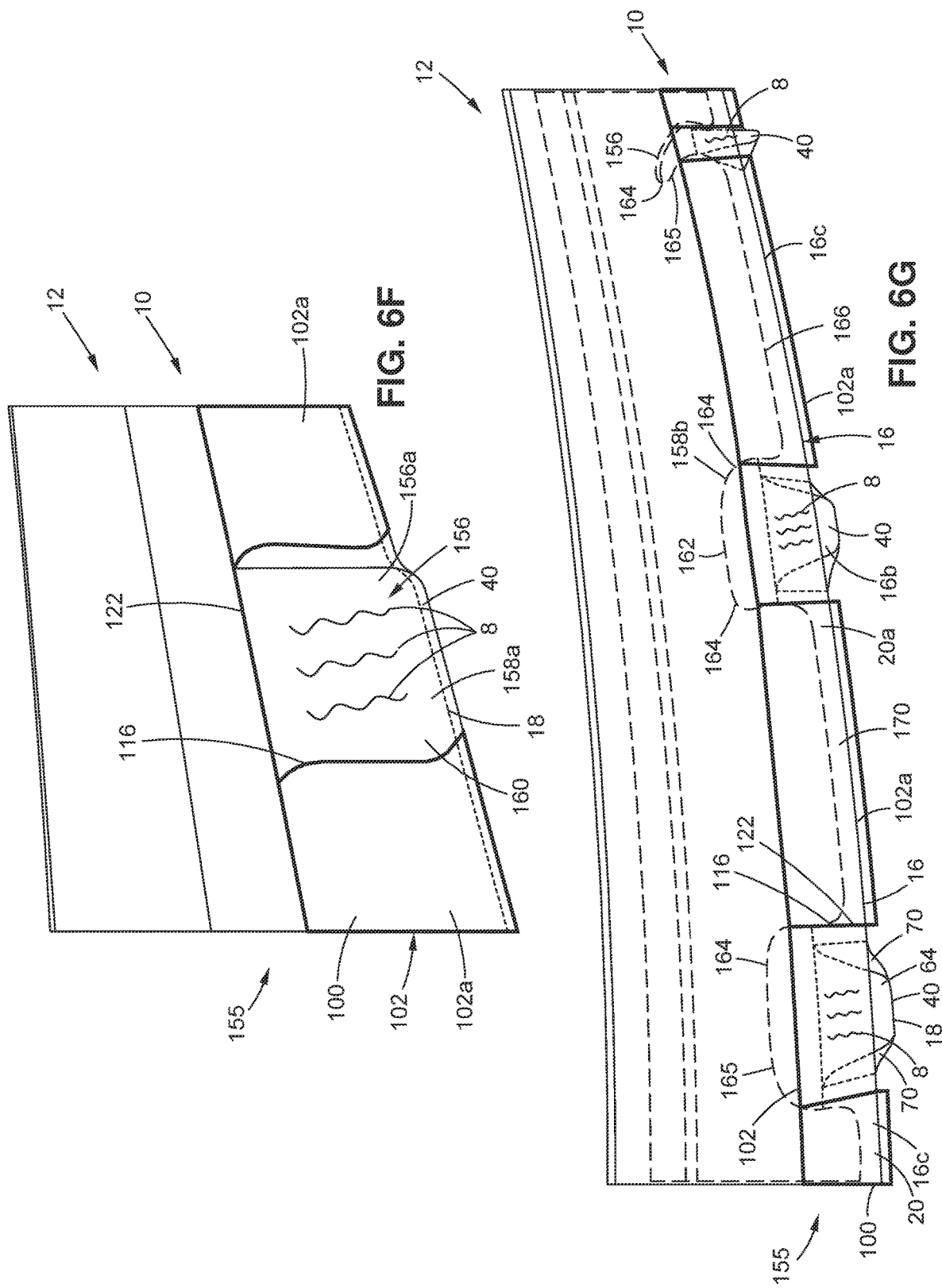

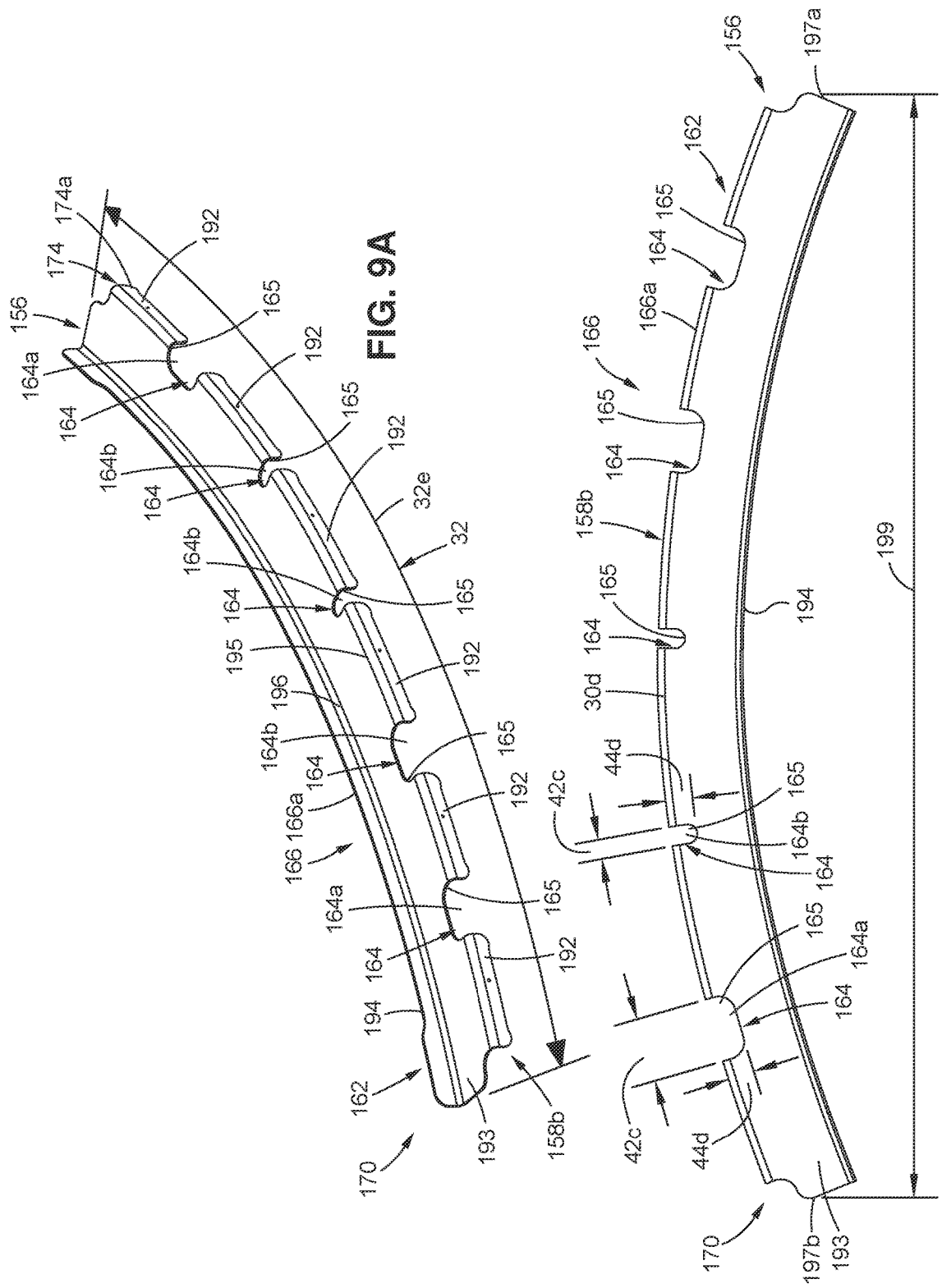

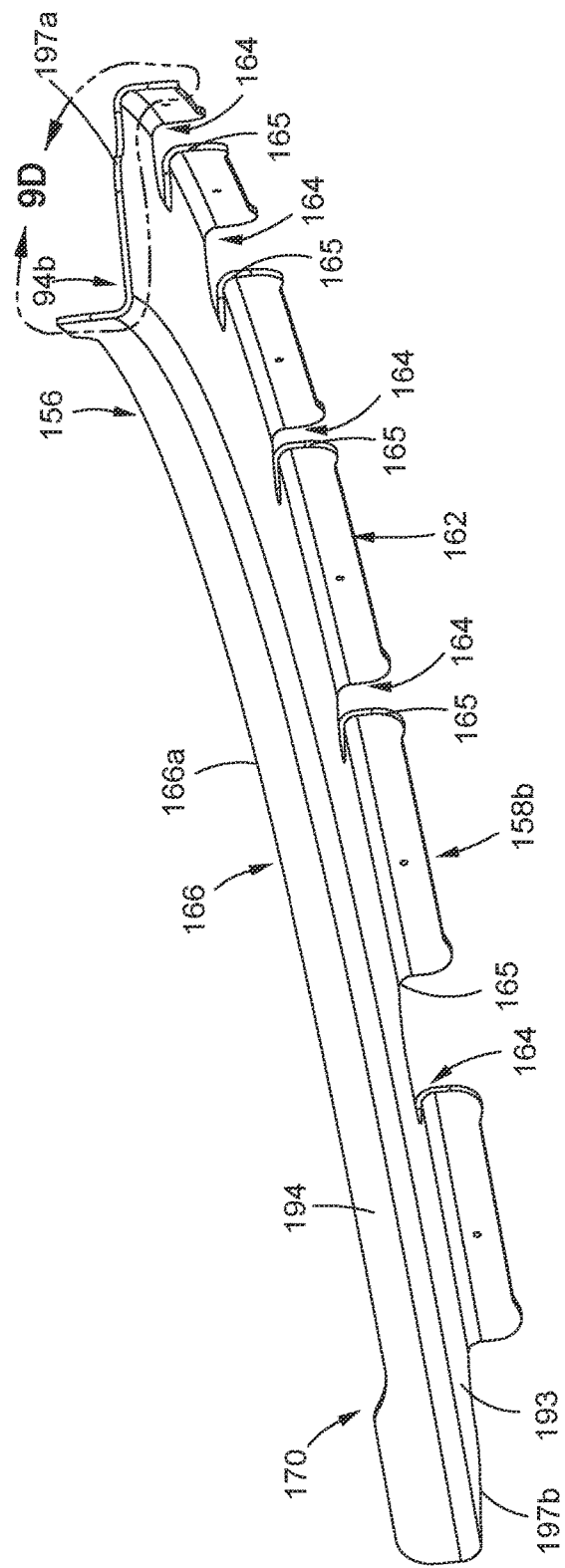
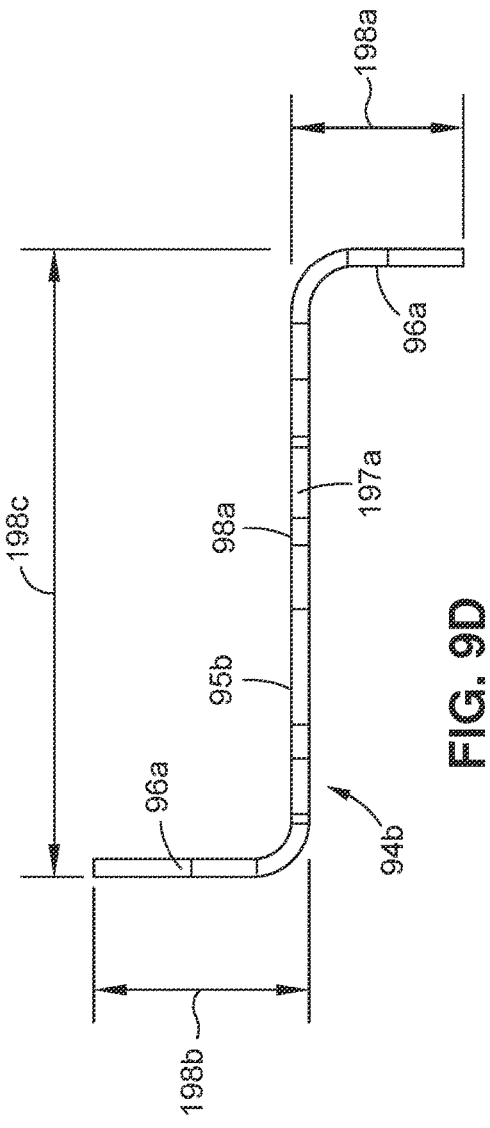
FIG. 9C
FIG. 9D

TENSIONED TOOLING ASSEMBLY FOR A THERMOPLASTIC COMPOSITE STAMP FORMING PROCESS, AND TENSIONED TOOLING SYSTEM AND METHOD OF USING THE SAME

FIELD

The disclosure relates generally to fabrication of thermoplastic composite parts, and more particularly, to tooling assemblies and systems for stamp forming of thermoplastic composite materials to form thermoplastic composite contoured curved parts for structures such as aircraft structures.

BACKGROUND

Thermoplastic composite parts for structures, such as aircraft structures, can include thermoplastic composite parts having curved contours or angles, for example, thermoplastic composite contoured curved flanged parts, for fuselage, wings, and other aircraft structures. Such thermoplastic composite parts can be fabricated using a stamp forming process, such as a bot stamp forming process, to stamp form one or more flat curved thermoplastic composite blanks or charges, with tooling, into formed thermoplastic composite parts having curved contours or angles, that after forming may be trimmed or cut to a final formed part or a net part.

Known nominal tooling assemblies exist for use with stamp forming, such as hot stamp forming, to stamp form flat curved thermoplastic composite blanks or charges into formed thermoplastic composite parts having curved contours or angles, for example, thermoplastic composite contoured curved flanged parts, such as for aircraft. During such stamp forming process with a known nominal tooling assembly, the flat curved thermoplastic composite blank or charge, which initially has a large outer arc length, is pressed between curved and contoured tools of the nominal tooling assembly, and the large outer arc length is reduced to a smaller outer arc length, resulting in excess material bulk. Such excess material bulk may cause the formation of undesired wrinkling or folding over of the excess material bulk during the stamp forming, thus resulting in wrinkles in one or more areas, for example, contoured or outer flange areas in the final formed part.

It would be desirable to control and direct wrinkle formation to portions or areas that will be trimmed or removed from formed thermoplastic composite parts having curved contours or angles, for example, thermoplastic composite contoured curved flanged parts, for fuselage, wings, and other aircraft structures, in stamp forming, such as hot stamp forming, thus resulting in removal of the wrinkles in a final formed part. Accordingly, there is a need in the art for an improved tooling assembly, tooling system, and method of using the same for stamp forming, such as hot stamp forming, to control and direct wrinkle formation during stamp forming, and to eliminate wrinkles in formed thermoplastic composite parts having curved contours or angles, for example, formed thermoplastic composite contoured curved flanged parts, such as for aircraft, and to provide other advantages over known tooling assemblies, systems, and methods.

SUMMARY

Example implementations of the present disclosure provide a tensioned tooling assembly for a thermoplastic composite stamp forming process, and a tensioned tooling system and method of using the same. As discussed in the below detailed description, versions of the tensioned tooling assembly, tensioned tooling system, and method may provide significant advantages over known tooling assemblies, systems, and methods.

In a version of the disclosure, there is provided a tensioned tooling assembly for a thermoplastic composite stamp forming process. The tensioned tooling assembly comprises a bottom tool.

The bottom tool comprises a bottom tool outer flange having a bottom end, a bottom tool outer radius, and a bottom tool outer curved surface having an arc length and disposed between the bottom end and the bottom tool outer radius. The bottom tool further comprises a plurality of tensioning protruding portions spaced apart on, and outwardly extending from, the bottom tool outer curved surface of the bottom tool outer flange. Each tensioning protruding portion defines an angle formed from the bottom tool outer radius to the bottom end of the bottom tool outer flange.

The tensioned tooling assembly further comprises a top tool. The top tool comprises a top flange having a top end, a top outer radius, and a top curved surface disposed between the top end and the top outer radius. The top tool further comprises a plurality of corresponding portions formed in, and spaced apart on, the top curved surface. The plurality of corresponding portions correspond to the plurality of tensioning protruding portions.

During the thermoplastic composite stamp forming process, a thermoplastic composite charge is pressed between the bottom tool outer flange of the bottom tool and the top flange of the top tool, and the plurality of tensioning protruding portions push first portions of the thermoplastic composite charge outwardly, causing wrinkles to form in the first portions which are removed after forming of a net part from the thermoplastic composite charge, and the plurality of tensioning protruding portions apply tension to second portions of the thermoplastic composite charge which remain after forming of the net part.

In another version of the disclosure, there is provided a tensioned tooling system for a thermoplastic composite stamp forming process to eliminate wrinkles in a flange of a contoured curved flanged part. The tensioned tooling system comprises a tensioned tooling assembly.

The tensioned tooling assembly comprises a bottom tool. The bottom tool comprises a bottom tool outer flange having a bottom end, a bottom tool outer radius, and a bottom tool outer curved surface having an arc length and disposed between the bottom end and the bottom tool outer radius. The bottom tool further comprises a plurality of tensioning protruding portions spaced apart on, and outwardly extending from, the bottom tool outer curved surface of the bottom tool outer flange. Each tensioning protruding portion defines an angle formed from the bottom tool outer radius to the bottom end of the bottom tool outer flange.

The tensioned tooling assembly further comprises a top tool. The top tool comprises a top flange having a top end, a top outer radius, and a top curved surface disposed between the top end and the top outer radius. The top tool further comprises a plurality of corresponding portions formed in, and spaced apart on, the top curved surface. The plurality of corresponding portions correspond to the plurality of tensioning protruding portions.

The tensioned tooling system further comprises a thermoplastic composite charge having an outer arc length. During the thermoplastic composite stamp forming process, the thermoplastic composite charge is pressed between the bottom tool outer flange of the bottom tool and the top flange of the top tool, and the plurality of tensioning protruding portions push first portions of the thermoplastic composite charge outwardly, causing wrinkles to form in the first portions which are removed after forming of the contoured curved flanged part from the thermoplastic composite charge. The plurality of tensioning protruding portions apply tension to second portions of the thermoplastic composite charge which remain after forming of the contoured curved flanged part, resulting in elimination of wrinkles in the flange of the contoured curved flanged part.

In another version of the disclosure, there is provided a method of using a tensioned tooling system for a thermoplastic composite stamp forming process to eliminate wrinkles in a flange of a contoured curved flanged part. The method comprises the step of providing a tensioned tooling system. The tensioned tooling system comprises a tensioned tooling assembly.

The tensioned tooling assembly comprises a bottom tool. The bottom tool comprises a bottom tool outer flange having a bottom end, a bottom tool outer radius, and a bottom tool outer curved surface having an arc length and disposed between the bottom end and the bottom tool outer radius. The bottom tool further comprises a plurality of tensioning protruding portions spaced apart on, and outwardly extending from, the bottom tool outer curved surface of the bottom tool outer flange. Each tensioning protruding portion defines an angle formed from the bottom tool outer radius to the bottom end of the bottom tool outer flange.

The tensioned tooling assembly further comprises a top tool. The top tool comprises a top flange having a top end, a top outer radius, and a top curved surface disposed between the top end and the top outer radius. The top tool further comprises a plurality of corresponding portions formed in, and spaced apart on, the top curved surface. The plurality of corresponding portions correspond to the plurality of tensioning protruding portions.

The tensioned tooling system further comprises a thermoplastic composite charge having an outer arc length.

The method further comprises the step of using the tensioned tooling assembly to press the thermoplastic composite charge between the bottom tool outer flange of the bottom tool and the top flange of the top tool during the thermoplastic composite stamp forming process. The method further comprises the step of using the plurality of tensioning protruding portions to push first portions of the thermoplastic composite charge outwardly, causing wrinkles to form in the first portions, and to apply tension to second portions of the thermoplastic composite charge during the thermoplastic composite stamp forming process The method further comprises the step of forming the flange of the contoured curved flanged part from the thermoplastic composite charge during the thermoplastic composite stamp forming process. The method further comprises the step of removing the first portions from the flange of the contoured curved flanged part, resulting in wrinkle elimination in the flange of the contoured curved flanged part.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 3A is an illustration of a front perspective view of an exemplary bottom tool for a tensioned tooling assembly of the disclosure;

FIG. 3B is an illustration of a front view of the bottom tool of FIG. 3A;

FIG. 3C is an illustration of a back perspective view of the bottom tool of FIG. 3A;

FIG. 3D is an illustration of a right side back perspective view of the bottom tool of FIG. 3A;

FIG. 4A is an illustration of a front perspective view of an exemplary top tool for a tensioned tooling assembly of the disclosure;

FIG. 4B is an illustration of a front view of the top tool of FIG. 4A;

FIG. 4C is an illustration of a back perspective view of the top tool of FIG. 4A;

FIG. 4D is an illustration of a right side back perspective view of the top tool of FIG. 4A;

FIG. 6A is an illustration of a front perspective view of an exemplary tensioned tooling assembly of the disclosure in an open position, showing a top tool and a bottom tool, where the bottom tool has integral tensioning protruding portions;

FIG. 6B is an illustration of an enlarged front perspective view of a corresponding portion, in the form of a cut-out corresponding portion, of the top tool of the tensioned tooling assembly of FIG. 6A;

FIG. 6C is an illustration of an enlarged front perspective view of another version of a corresponding portion, in the form of a protruding corresponding portion, of a top tool of a tensioned tooling assembly;

FIG. 6D is an illustration of a front perspective view of an exemplary tensioned tooling assembly of the disclosure in a closed position, showing a top tool and a bottom tool, where the bottom tool has a removable tensioning protruding portion;

FIG. 6E is an illustration of an enlarged front perspective view of circle 6E of FIG. 6D showing the removable tensioning protruding portion of the bottom tool of the tensioned tooling assembly of FIG. 6D;

FIG. 6F is an illustration of an enlarged front perspective view of an exemplary tensioned tooling system with an exemplary tensioned tooling assembly in a closed position, and showing a formed thermoplastic composite part portion with an initial geometry;

FIG. 6G is an illustration of a front perspective view of an exemplary tensioned tooling system with the tensioned tooling assembly of FIG. 6A in a closed position, and showing a formed thermoplastic composite part with a final geometry;

FIG. 9A is an illustration of a front perspective view of an exemplary formed thermoplastic composite part with a final geometry in a trimmed form;

FIG. 9B is an illustration of a back view of the formed thermoplastic composite part of FIG. 9A;

FIG. 9C is an illustration of a right side back perspective view of the formed thermoplastic composite part of FIG. 9A;

FIG. 9D is an illustration of an enlarged right side view of circle 9D of FIG. 9C showing a side profile of the formed thermoplastic composite part of FIG. 9C;

Figure 1:
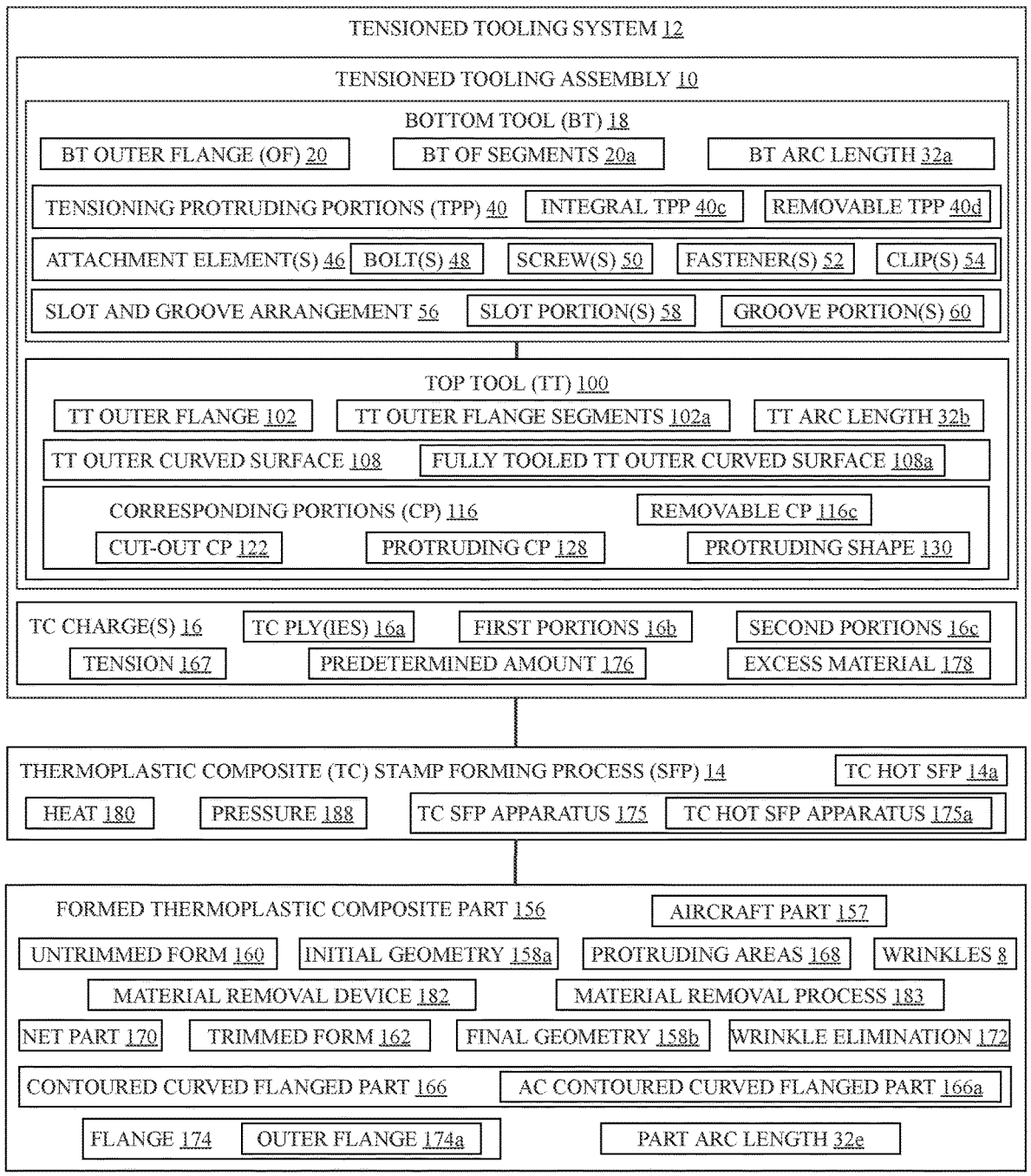
FIG. 1 is an illustration of a block diagram of an exemplary version of a tensioned tooling system of the disclosure having an exemplary tensioned tooling assembly of the disclosure for a thermoplastic composite stamp forming process.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

As disclosed herein, there is provided a tensioned tooling assembly 10 (see FIGS. 1, 6A) and a tensioned tooling system 12 (see FIGS. 1, 6B, 7) using the tensioned tooling assembly 10. The tensioned tooling assembly 10 and the tensioned tooling system 12 are used for a thermoplastic composite stamp forming process 14 (see FIG. 1), such as a thermoplastic composite hot stamp forming process 14a (see FIG. 1), of a thermoplastic composite charge 16 (see FIG. 5), such as a thermoplastic composite ply 16a (see FIG. 5).

Now referring to FIG. 1, FIG. 1 is an illustration of a block diagram of an exemplary version of the tensioned tooling system 12 of the disclosure having exemplary versions of the tensioned tooling assembly 10 of the disclosure for use in the thermoplastic composite (TC) stamp forming process (SFP) 14, such as the thermoplastic composite (TC) hot stamp forming process (SFP) 14a. The thermoplastic composite stamp forming process 14, such as the thermoplastic composite hot stamp forming process 14a, uses a thermoplastic composite stamp forming apparatus 175 (see FIGS. 1, 7), such as a thermoplastic composite hot stamp forming apparatus 175a (see FIGS. 1, 7), to form one or more thermoplastic composite charges 16 (see FIGS. 1, 5) or thermoplastic composite plies 16a (see FIG. 1), using heat 180 (see FIG. 1) and pressure 188 (see FIG. 1), into a formed thermoplastic composite part 156 (see FIG. 1).

The blocks in FIG. 1 represent elements, and lines connecting the various blocks do not imply any particular dependency of the elements. Furthermore, the connecting lines shown in the various figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the tensioned tooling assembly 10 and the tensioned tooling system 12 in FIG. 1 are not meant to imply physical or architectural limitations to the manner in which an illustrative example may be implemented. Other components in addition to, or in place of, the ones illustrated may be used. Some components may be unnecessary.

As shown in FIG. 1, the tensioned tooling assembly 10 comprises a bottom tool (BT) 18 having a bottom tool (BT)

outer flange (OF) 20 with bottom tool (BT) outer flange (OF) segments 20a between a plurality of tensioning protruding portions (TPP) 40. The bottom tool 18 further comprise a bottom tool outer radius 26 (see FIG. 3A) and a bottom tool outer curved surface 28 (see FIG. 3A). The bottom tool 18, including the bottom tool outer radius 26 and the bottom tool outer curved surface 28, has an arc length 32 (see FIG. 3A), such as a bottom tool (BT) arc length 32a (see FIGS. 1, 3A). The tensioning protruding portions 40 allow the bottom tool arc length 32a of the bottom tool 18, including the bottom tool outer curved surface 28, to match an outer arc length 32c (see FIG. 5) of the thermoplastic composite charge 16 (see FIGS. 1, 5).

As shown in FIG. 1, the bottom tool 18 comprises the plurality of tensioning protruding portions (TPP) 40, such as integral tensioning protruding portions (TPP) 40c, or such as the removable tensioning protruding portions (TPP) 40d. In one version, as shown in FIG. 1, the removable tensioning protruding portions 40d are removably coupled, or attached, to the bottom tool outer curved surface 28 (see FIG. 3A), and/or to the bottom tool outer flange 20 (see FIG. 3A), or to another location on the bottom tool 18, via one or more attachment elements 46 comprising one of, one or more bolts 48, one or more screws 50, one or more fasteners 52, one or more clips 54, or other suitable attachment elements.

In another version, as shown in FIG. 1, the removable tensioning protruding portions 40d are removably coupled, or attached, to the bottom tool outer curved surface 28 (see FIG. 3A), and/or to the bottom tool outer flange 20 (see FIG. 3A), or to another location on the bottom tool 18, via a slot and groove arrangement 56, where the removable tensioning protruding portion 40d has one or more slot portions 58 that may be formed on side faces 70 (see FIG. 3E), an inner side 75 (see FIG. 3C), or other suitable portions of the removable tensioning protruding portion 40d. The one or more slot portions 58 are designed, or configured, to be inserted into one or more groove portions 60 (see FIG. 1) formed on the bottom tool outer flange 20 of the bottom tool 18, or on another suitable location of the bottom tool 18 or of the tensioned tooling assembly 10.

Figure 3E:
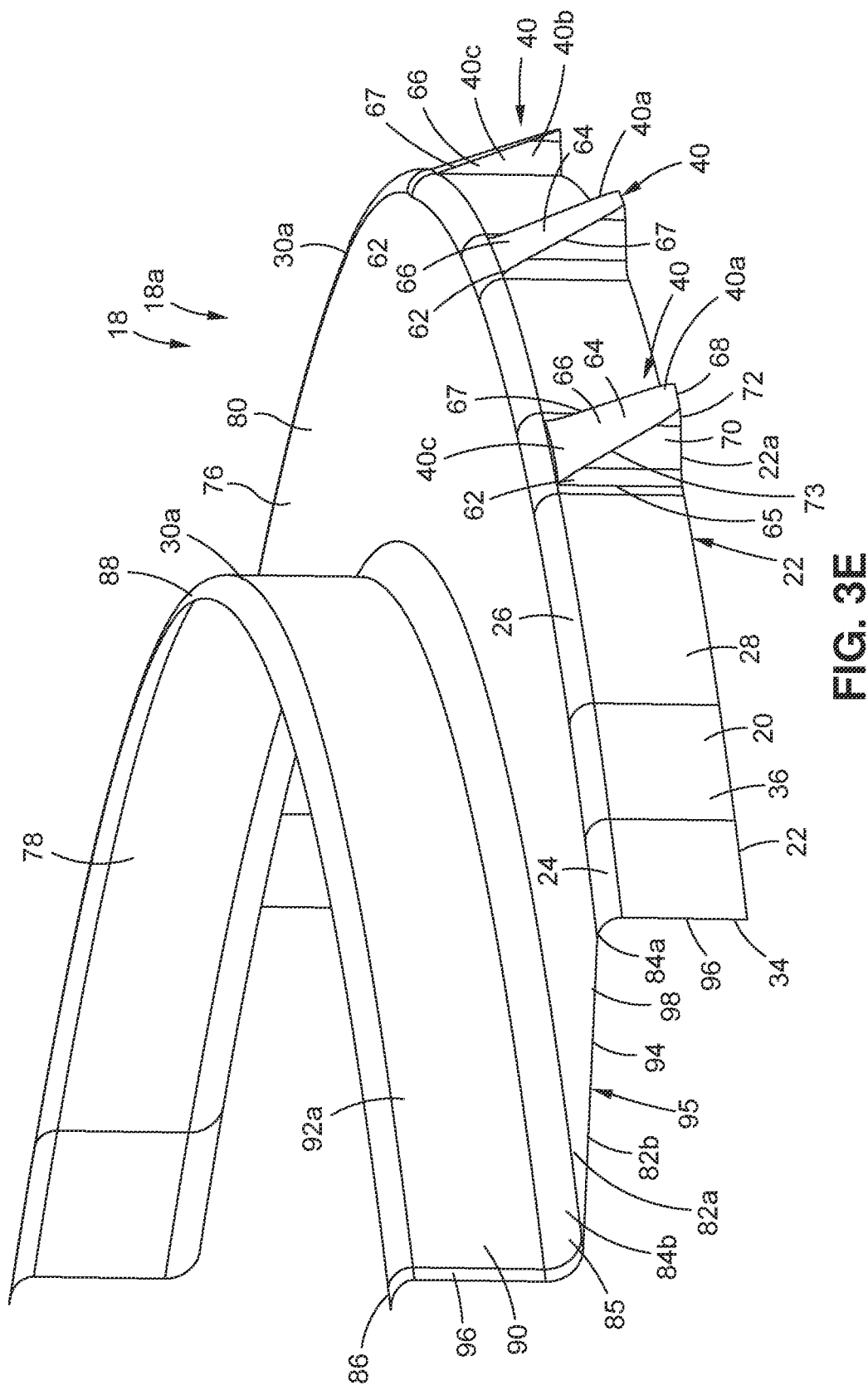
FIG. 3E is an illustration of an enlarged right side front perspective view of the bottom tool of FIG. 3A.

As shown in FIG. 3E, the tensioning protruding portions 40 are spaced apart on, and outwardly extend from, the bottom tool outer curved surface 28 of the bottom tool outer flange 20, and each tensioning protruding portion 40 defines an angle 62 formed from the bottom tool outer radius 26 to the bottom end 22 of the bottom tool outer flange 20.

As shown in FIG. 1, the tensioned tooling assembly 10 comprises a top tool (TT) 100 having a top tool (TT) outer flange 102 with top tool outer flange segments 102a between a plurality of corresponding portions (CP) 116. The top tool 100 further comprises a top tool outer radius 106 (see FIG. 4A) and a top tool outer curved surface 108 (see FIGS. 1, 4A), such as in one version, a fully tooled top tool (TT) outer curved surface 108a (see FIG. 1). The top tool 100, including the top tool outer radius 106 and the top tool outer curved surface 108, has an arc length 32 (see FIG. 4A), such as a top tool (TT) arc length 32b (see FIGS. 4A, 10).

As shown in FIG. 1, the top tool 100 comprises the plurality of corresponding portions (CP) 116, such as removable corresponding portions (CP) 166c, cut-out corresponding portions (CP) 122, and protruding corresponding portions (CP) 128 each having a protruding shape 130. As shown in FIG. 4A, the plurality of corresponding portions 116 are formed in, and spaced apart on, the top tool outer curved surface 108, and as shown in FIG. 6A, the plurality of corresponding portions 116 correspond to, and match, the plurality of tensioning protruding portions 40.

Preferably, if the bottom tool 18 has one or more removable tensioning protruding portions 40, the top tool 100 also has one or more removable corresponding portions 116c that match the respective removable tensioning protruding portions 40d. Similar to the removable tensioning protruding portions 40, the removable corresponding portions 116c, in one version, may be removably coupled, or attached, to the top tool outer curved surface 108 (see FIG. 3A), and to the top tool outer flange 102 (see FIGS. 3A, 10), via one or more attachment elements 46 (see FIG. 1) comprising one of, as shown in FIG. 1, one or more bolts 48, one or more screws 50, one or more fasteners 52, one or more clips 54, or other suitable attachment elements.

In another version, similar to the removable tensioning protruding portions 40, the removable corresponding portions 116c may be removably coupled, or attached, to the top tool outer curved surface 108 (see FIG. 4A), and to the top tool outer flange 102 (see FIG. 4A), via the slot and groove arrangement 56 (see FIG. 1), where the removable corresponding portion 116c has one or more slot portions 58 (see FIG. 1) that may be formed on sides 125 (see FIG. 4A), or other suitable portions of the removable corresponding portion 116c. The one or more slot portions 58 are designed, or configured, to be inserted into one or more groove portions 60 (see FIG. 1) formed on the top tool outer flange 102 of the top tool 100, or on another suitable location of the top tool 100 or of the tensioned tooling assembly 10.

Figure 5:
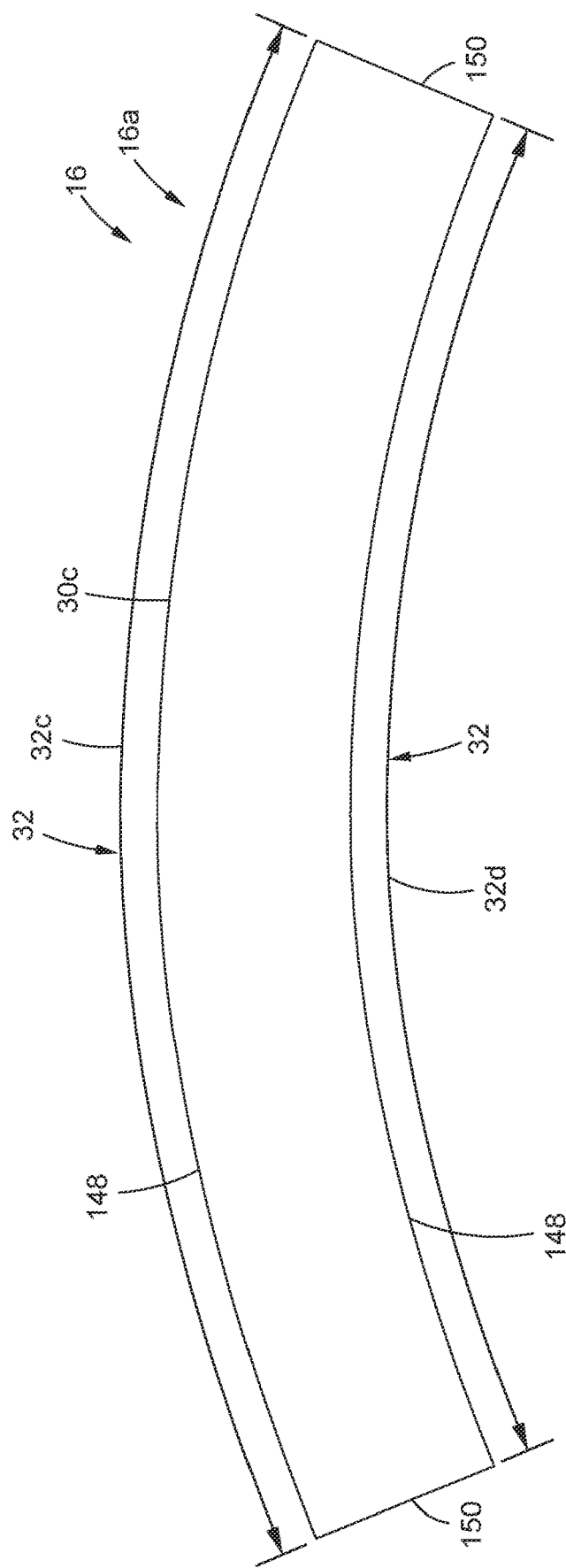
FIG. 5 is an illustration of a front view of an exemplary thermoplastic composite charge used in a tensioned tooling system of the disclosure.

As further shown in FIG. 1, the tensioned tooling system 12 comprises one or more thermoplastic composite (TC) charges 16, such as one or more thermoplastic composite (TC) plies 16a, each having an outer arc length 32c (see FIG. 5) and an inner arc length 32d (see FIG. 5). During the thermoplastic composite stamp forming process 14, the one or more thermoplastic composite charges 16 have first portions 16b (see FIG. 1) where the tensioning protruding portions 40 push and converge material bulk or ply waviness at and to the first portions 16b. The tensioning protruding portions 40 also apply tension 167 (see FIG. 1) to second portions 16c (see FIG. 1) of the one or more thermoplastic composite charges 16 located adjacent to the first portions 16b. The second portions 16c have wrinkles 8 (see FIG. 1) and form into protruding areas 168 (see FIG. 1) with wrinkles 8 that are present in the formed thermoplastic composite part 156 after forming and prior to a material removal process 183.

As shown in FIG. 1, the thermoplastic composite (TC) stamp forming process (SFP) 14, such as the thermoplastic composite (TC) hot stamp forming process (SFP) 14, uses a thermoplastic composite (TC) stamp forming process (SFP) apparatus 175, such as a thermoplastic composite (TC) hot stamp forming process (SFP) apparatus 175a, with the tensioned tooling assembly 10 to form the one or more thermoplastic composite charges 16 into the formed thermoplastic composite part 156, for example, an aircraft part 157. Right after formation, and prior to the material removal process 183 (see FIG. 1), the formed thermoplastic composite part 156 is in an untrimmed form 160 (see FIG. 1) and has an initial geometry 158a (see FIG. 1) with the protruding areas 168 (see FIG. 1) having the wrinkles 8 (see FIG. 1).

The protruding areas 168 (see FIG. 1) with the wrinkles 8 (see FIG. 1) of the formed thermoplastic composite part 156, are removed from the formed thermoplastic composite part 156, with the material removal process 183 (see FIG. 1), such as trimming, cutting, or another suitable material removal process, using a material removal device 182 (see FIG. 1), such as a trimming device, a cutting device, or another suitable material removal device, to obtain the formed thermoplastic composite part 156, such as a net part 170 (see FIG. 1), in a trimmed form 162 (see FIG. 1) and having a final geometry 158b (see FIG. 1) with the protruding areas 168 and the wrinkles 8 removed, thus resulting in wrinkle elimination 172 (see FIG. 1) in the net part 170.

As shown in FIG. 1, in one version, the net part 170 comprises a contoured curved flanged part 166, such as an aircraft (AC) contoured curved flanged part 166a, having a flange 174, such as an outer flange 174a. As shown in FIG. 1, the flange 174, such as the outer flange 174a, of the contoured curved flanged part 166, such as the aircraft contoured curved flanged part 166a, has a part arc length 32e. The part arc length 32e matches, or is equal to, the outer arc length 32c (see FIG. 5) of the thermoplastic composite charge 16 (see FIGS. 1, 5).

Figure 2:
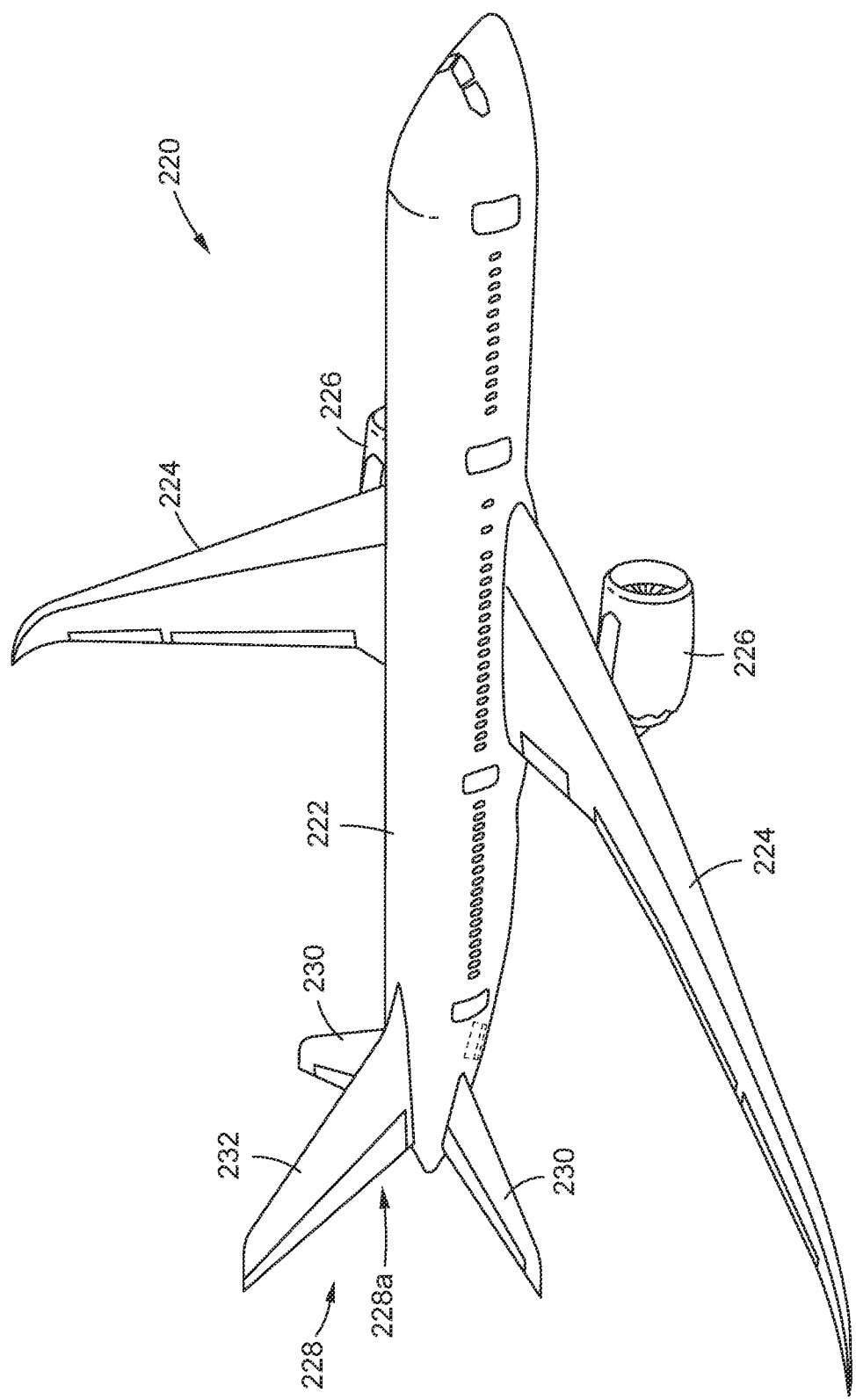
FIG. 2 is an illustration of a perspective view of an exemplary aircraft incorporating aircraft parts that may be manufactured using an exemplary version of a tensioned tooling assembly, a tensioned tooling system, and a method of the disclosure.

Now referring to FIG. 2, FIG. 2 is an illustration of a perspective view of an exemplary aircraft 220 incorporating aircraft parts 157 (see FIG. 1) that may be manufactured using an exemplary version of the tensioned tooling assembly 10 (see FIGS. 1, 6A), the tensioned tooling system 12 (see FIGS. 1, 6G), and the method 200 (see FIG. 10) of the disclosure. FIG. 2 shows the aircraft 220 with the aircraft parts 157 (see FIG. 1), such as the fuselage 222, wings 224, the empennage 228, such as the tail 228a, horizontal stabilizers 230, and the vertical stabilizer 232, or portions of these aircraft parts 157 (see FIG. 1), that that may be manufactured using an exemplary version of the tensioned tooling assembly 10 (see FIGS. 1, 6A), the tensioned tooling system 12 (see FIGS. 1, 6G), and the method 200 (see FIG. 10).

Now referring to FIGS. 3A-3E, FIGS. 3A-3E show an exemplary version of a bottom tool 18, or a bottommost tool, for the tensioned tooling assembly 10, of the disclosure. The bottom tool 18 is preferably in a form of a tensioning protruding portion tool 18a (see FIGS. 3A-3E). The bottom tool 18 is a part of the tensioned tooling assembly 10 (see FIGS. 1, 6A). FIG. 3A is an illustration of a front perspective view of the exemplary bottom tool 18 for the tensioned tooling assembly 10 of the disclosure. FIG. 3B is an illustration of a front view of the bottom tool 18 of FIG. 3A. FIG. 3C is an illustration of a back perspective view of the bottom tool 18 of FIG. 3A. FIG. 3D is an illustration of a right side back perspective view of the bottom tool 18 of FIG. 3A. FIG. 3E is an illustration of an enlarged right side front perspective view of the bottom tool 18 of FIG. 3A.

As shown in FIGS. 3A-3E, the bottom tool 18, such as the bottommost tool, comprises a bottom tool outer flange 20 having a bottom end 22 and a top end 24, a bottom tool outer radius 26, and a bottom tool outer curved surface 28. The bottom tool 18 has an arc shape 30 (see FIG. 3A), such as an arc shape 30a (see FIGS. 3A, 3E), including the bottom tool outer curved surface 28 and the bottom tool outer flange 20. The bottom tool outer curved surface 28 and the bottom tool outer flange 20 have an arc length 32 (see FIG. 3A), or arc span, such as a bottom tool arc length 32a (see FIG. 3A), or first arc span, that spans from a first side 34 (see FIGS. 3A-3E) to a second side 35 (see FIGS. 3A-3D) of the bottom tool outer flange 20 and the bottom tool 18. As shown in FIG. 3A, the bottom tool outer curved surface 28 is disposed between the bottom end 22 and the top end 24 and between the bottom end 22 and the bottom tool outer radius 26. As shown in FIGS. 3A, 3E, the bottom tool outer curved surface 28 has an outer side 36, or convex side. As shown in FIGS. 3B-3D, the bottom curved side 28 has an inner side 38, or concave side.

As further shown in FIGS. 3A-3E, the bottom tool 18, such as the tensioning protruding portion tool 18a, comprises a plurality of tensioning protruding portions 40, or bump-out portions, spaced apart on, and outwardly extending from, the outer side 36 of the bottom tool outer curved surface 28 of the bottom tool outer flange 20. As shown in FIGS. 3A-3E, the bottom tool 18, such as the tensioning protruding portion tool 18a, comprises tensioning protruding portions 40, such as first tensioning protruding portions 40a and second tensioning protruding portions 40b. As shown in FIGS. 3A, 3C, the tensioning protruding portions 40, or bump-out portions, are adjacent to, and positioned between, bottom tool outer flange segments 20a. As shown in FIG. 3C, each bottom tool outer flange segment 20a alternates with each tensioning protruding portion 40, along the bottom tool outer flange 20. In one version, as shown in FIGS. 3A-3E, the bottom tool outer flange 20 comprises five (5) tensioning protruding portions 40, including three (3) first tensioning protruding portions 40a and two (2) second tensioning protruding portions 40b, alternating between six (6) bottom tool outer flange segments 20a. In other versions, depending on a formed thermoplastic composite part 156 (see FIG. 1) that is formed, the number of tensioning protruding portions 40, including the number of first tensioning protruding portions 40a and the second tensioning protruding portions 40b, may be one (1) to four (4) or greater than five (5), and the number of bottom tool outer flange segments 20a may be two (2) to five (5) or greater than six (6).

The plurality of tensioning protruding portions 40, such as the first tensioning protruding portions 40a and the second tensioning protruding portions 40b, each has a width 42 (see FIG. 3B), and the widths 42 of the plurality of tensioning protruding portions 40 may vary, such as one or more varying widths 42. In one version, as shown in FIG. 3B, the first tensioning protruding portion 40a has a width 42, such as a first width 42a, and the second tensioning protruding portion 40b has a width 42, such as a second width 42b. As further shown in FIG. 3B, the first width 42a of the first tensioning protruding portion 40a is greater than the second width 42b of the second tensioning protruding portion 40b. In this version of the bottom tool 18, the first tensioning protruding portions 40a are larger in width 42 and larger in size than the width 42 and the size of the second tensioning protruding portions 40b. In other versions, all of the tensioning protruding portions 40 may be of equal width and equal size, all of the tensioning protruding portions 40 may be of different widths and different sizes, or the tensioning protruding portions 40 may be a combination of varying widths and sizes.

As further shown in FIG. 3B, a height 44, such as a first height 44a, of the first tensioning protruding portion 40a, is equal, or substantially equal, to the height 44, such as a second height 44b, of the second tensioning protruding portion 40b. As further shown in FIG. 3B, the first height 44a of the first tensioning protruding portion 40a and the second height 44b of the second tensioning protruding portion 40b are equal, or substantially equal, to the height 44, such as a third height 44c, of the bottom tool outer flange 20.

In one version, as shown in FIGS. 3A-3E, the plurality of tensioning protruding portions 40 comprise integral tensioning protruding portions 40c. The integral tensioning protruding portions 40c are integrally formed with, and in, or integrated with, and are a part of the bottom tool outer curved surface 28 and the bottom tool outer flange 20.

In another version, as shown in FIGS. 6D, 6E, and discussed in further detail below, one or more of the plurality of tensioning protruding portions 40 comprise one or more removable tensioning protruding portions 40d that may be removable and interchangeable. In this version, the one or more removable tensioning protruding portions 40d are removably coupled, or attached, to the bottom tool outer curved surface 28, and/or to the bottom tool outer flange 20, or to another location on the bottom tool 18, via one or more attachment elements 46 (see FIGS. 1, 6D, 6E) comprising one of, one or more bolts 48 (see FIGS. 1, 6D, 6E), one or more screws 50 (see FIG. 1), one or more fasteners 52 (see FIG. 1), one or more clips 54 (see FIG. 1), or other suitable attachment elements.

In another version, the one or more removable tensioning protruding portions 40d are removably coupled, or attached, to the bottom tool outer curved surface 28, and to the bottom tool outer flange 20, via a slot and groove arrangement 56 (see FIG. 1), where the removable tensioning protruding portion 40d has one or more slot portions 58 (see FIG. 1) that may be formed on side faces 70 (see FIG. 3E), an inner side 75 (see FIG. 3C), or other suitable portions of the removable tensioning protruding portion 40d. The one or more slot portions 58 are designed, or configured, to be inserted into one or more groove portions 60 (see FIG. 1) formed on the bottom tool outer flange 20 of the bottom tool 18, or on another suitable location of the bottom tool 18 or of the tensioned tooling assembly 10.

As shown in 3E, each tensioning protruding portion 40 defines an angle 62 formed from the bottom tool outer radius 26, or from the top end 24, to the bottom end 22 of the bottom tool outer flange 20. As shown in 3E, the angle 62 is formed between an outer face 64 and a straight side portion 65 of each tensioning protruding portion 40. As further shown in FIG. 3E, each tensioning protruding portion 40 has a protruding body 66 that is outwardly protruding or extending from the bottom tool outer flange 20 and the bottom tool outer curved surface 28, and that progressively and increasingly protrudes or bumps out from the top end 24 to the bottom end 22, where the outward protrusion or extension is greatest at the bottom end 22 and least at the top end 24. As shown in FIG. 3E, the protruding body 66 of each tensioning protruding portion 40 comprises the outer face 64 with a downwardly sloped profile 67 and a substantially trapezoid shape 68. In other versions, the outer face 64 of the tensioning protruding portion 40 has another suitable shape. As further shown in FIGS. 3B, 3E, the protruding body 66 of each tensioning protruding portion 40 has side faces 70 on opposite sides of the outer face 64. As shown in FIG. 3E, each side face 70 has a substantially triangle shape 72 formed by the straight side portion 65, an angled side portion 73 coextensive with the downwardly sloped profile 67 of the outer face 64, and a bottom end portion 22a. The side faces 70 may be curved outwardly, may be substantially straight, or may be another suitable shape. As further shown in FIG. 3B, each tensioning protruding portion 40 has boundary sides 74, such as three boundary sides 74, that border the protruding body 66. As shown in FIG. 3C, the protruding body 66 of each tensioning protruding portion 40 further has an inner side 75.

As shown in FIGS. 3A-3E, the bottom tool 18 further comprises a bottom tool web 76, or body, formed between, and integral with, the bottom tool outer flange 20 and a bottom tool inner flange 78. As shown in FIG. 3E, the bottom tool web 76 has a flat surface 80, or a substantially flat surface, with the arc shape 30a. As further shown in FIG. 3E, the flat surface 80 of the bottom tool web 76 has an outer side 82a, an inner side 82b, a first end 84a integral, or continuous, with the top end 24 of the bottom tool outer flange 20, and a second end 84b integral, or continuous, with a bottom end 85 of the bottom tool inner flange 78. As further shown in FIG. 3E, the bottom tool inner flange 78 comprises the bottom end 85, a top end 86, a bottom tool inner radius 88, and a bottom tool inner curved surface 90. The bottom tool inner curved surface 90 has the arc shape 30a (see FIG. 3E), and the bottom tool inner curved surface 90 is disposed between the bottom end 85 and the top end 86 and between the bottom end 85 and the bottom tool inner radius 88. As shown in FIGS. 3A, 3E, the bottom tool inner curved surface 90 has an outer side 92a, or convex side. As shown in FIGS. 3B-3D, the bottom tool inner curved surface 90 has an inner side 92b, or concave side. The bottom tool inner flange 78 does not have any tensioning protruding portions 40 or bump-out portions like the bottom tool outer flange 20 does.

As further shown in FIG. 4E, the bottom tool 18 has a side profile 94 at the first side 34 and at the second side 35 of the bottom tool 18. The side profile 94 preferably has a substantially Z-shaped configuration 95 (see FIG. 3E) with vertical portions 96 and a horizontal portion 98 connected between ends of the vertical portions 96.

The bottom tool 18 may be made of a metal material such as steel, stainless steel, aluminum, nickel-iron alloy, elastomers such as rubber, or another suitable metal or polymer material.

Now referring to FIGS. 4A-4D, FIGS. 4A-4D show an exemplary version of a top tool 100, or a topmost tool, for the tensioned tooling assembly 10, of the disclosure. The top tool 100 is preferably in a form of a corresponding portion tool 100a (see FIGS. 4A-4D). The top tool 100 is a part of the tensioned tooling assembly 10 (see FIGS. 1, 6A), and the top tool 100 is configured to be aligned with, and clamped or joined on top of, the bottom tool 18, when in use. FIG. 4A is an illustration of a front perspective view of the exemplary top tool 100 for the tensioned tooling assembly 10 of the disclosure. FIG. 4B is an illustration of a front view of the top tool 100 of FIG. 4A. FIG. 4C is an illustration of a back perspective view of the top tool 100 of FIG. 4A. FIG. 4D is an illustration of a right side back perspective view of the top tool 100 of FIG. 4A.

As shown in FIGS. 4A-4D, the top tool 100, such as the topmost tool, comprises a top tool outer flange 102 having a bottom end 104, a top end 105, a top tool outer radius 106 (see FIG. 4A), and a top tool outer curved surface 108 (see FIG. 4A). The top tool 100 has an arc shape 30, such as an arc shape 30b (see FIG. 4A), including the top tool outer curved surface 108 and the top tool outer flange 102. The top tool outer curved surface 108 and the top tool outer flange 102 has an arc length 32 (see FIG. 4A), or arc span, such as a top tool arc length 32b (see FIG. 4A), or top tool arc span, that spans from a first side 110 (see FIGS. 4A-4D) to a second side 112 (see FIGS. 4A-4D) of the top tool outer flange 102 and the top tool 100. As shown in FIG. 4A, the top tool outer curved surface 108 is disposed between the bottom end 104 and the top end 105 and between the bottom end 104 and the top tool outer radius 106. As shown in FIGS. 4A-4B, the top tool outer curved surface 108 has an outer side 114, or convex side. As shown in FIGS. 4C-4D, the top tool outer curved side 108 has an inner side 115, or concave side.

As further shown in FIGS. 4A-4D, the top tool 100, such as the corresponding portion tool 100a, comprises a plurality of corresponding portions 116 formed in, and spaced apart on, the top tool outer curved surface 108. The plurality of corresponding portions 116 are designed and configured to correspond to the plurality of tensioning protruding portions 40 (see FIG. 4A), such as correspond to the position, width, and height of the plurality of tensioning protruding portions 40. As shown in FIGS. 4A-4D, in one version, the corresponding portions 116 comprise first corresponding portions 116a and second corresponding portions 116b.

As shown in FIGS. 4A, 4C, the corresponding portions 116 are adjacent to, and positioned between, top tool outer flange segments 102a. As shown in FIG. 4C, each top tool outer flange segment 102a alternates with each corresponding portion 116, along the top tool outer flange 102. In one version, as shown in FIGS. 4A-4D, the top tool outer flange 102 comprises five (5) corresponding portions 116, including three (3) first corresponding portions 116a and two (2) second corresponding portions 116b, alternating between six (6) top tool outer flange segments 102a. In other versions, depending on the formed thermoplastic composite part 156 (see FIG. 1) that is formed, the number of corresponding portions 116, including the number of first corresponding portions 116a and the second corresponding portions 116b, may be one (1) to four (4) or greater than five (5), and the number of top tool outer flange segments 102a may be two (2) to five (5) or greater than six (6).

The plurality of corresponding portions 116, such as the first corresponding portions 116a and second corresponding portions 116b, each has a width 118 (see FIG. 4B), and the widths 118 of the plurality of corresponding portions 116 may vary, such as one or more varying widths 118. In one version, as shown in FIG. 4B, the first corresponding portion 116a has a width 118, such as a first width 118a, and the second corresponding portion 116b has a width 118, such as a second width 118b. As further shown in FIG. 4B, the first width 118a of the first corresponding portion 116a is greater than the second width 118b of the second corresponding portion 116b. In this version of the top tool 100, the first corresponding portions 116a are larger in width 118 and larger in size than the width 118 and the size of the second corresponding portions 116b. In other versions, all of the corresponding portions 116 may be of equal width and equal size, all of the corresponding portions 116 may be of different widths and different sizes, or the corresponding portions 116 may be a combination of varying widths and sizes.

As further shown in FIG. 4B, a height 120, such as a first height 120a, of the first corresponding portion 116a, is equal, or substantially equal, to the height 120, such as a second height 120b, of the second corresponding portion 116b. As further shown in FIG. 4B, the first height 120a of the first corresponding portion 116a and the second height 120b of the second corresponding portion 116b are equal, or substantially equal, to the height 120, such as a third height 120c, of the top tool outer flange 102.

In one version, as shown in FIGS. 4A-4D, the corresponding portions 116 comprise cut-out corresponding portions 122. The cut-out corresponding portions 122 are cut out of, formed in, and are a part of the top tool outer curved surface 108 and the top tool outer flange 102. The cut-out corresponding portions 122 form openings 124 (see FIG. 4D) along the top tool outer flange 102, and are designed or configured to receive and surround the protruding body 66 of each tensioning protruding portion 40. As shown in FIG. 4A, each corresponding portion 116, such as each cut-out corresponding portion 122, has three (3) sides 125 surrounding the opening 124 with no side at the bottom, and each corresponding portion 116, such as each cut-out corresponding portion 122, has a U-shaped configuration 126. The sides 125 of the cut-out corresponding portions 122 are designed, or configured, to match with, or align with, the boundary sides 74 (see FIG. 3B) of the tensioning protruding portions 40. The locations of the cut-out corresponding portions 122 match, or correspond to, the locations of the respective tensioning protruding portions 40 (see FIG. 3A).

As shown in FIG. 4C, in one version, the cut-out corresponding portions 122 comprise first cut-out corresponding portions 122a and second cut-out corresponding portions 122b, where the first cut-out corresponding portions 122a are larger in shape and size than the second cut-out corresponding portions 122b. In other versions, all of the cut-out corresponding portions 122 may be of equal width and equal size, all of the cut-out corresponding portions 122 may be of different widths and different sizes, or the cut-out corresponding portions 122 may be a combination of varying widths and sizes.

In another version, the plurality of corresponding portions 116 on the top tool 100 comprise protruding corresponding portions 128 (see FIGS. 1, 6C) having a protruding shape 130 (see FIGS. 1, 6C), rather than cut-outs, that correspond to or match the shape and size of each respective tensioning protruding portion 40 on the bottom tool 18, when the top tool 100 is nested over the bottom tool 18. In this version, the top tool outer curved surface 108 may comprise a fully tooled top tool outer curved surface 108a (see FIGS. 1, 6C).

The corresponding portions 116, in the form of the cut-out corresponding portions 122 (see FIG. 6E), or in the form of the protruding corresponding portions 128 (see FIG. 6C), may also be configured, or designed, to be removable corresponding portions 116c (see FIG. 1) that are removable from the top tool outer flange 102 of the top tool 100, and in particular, when the respective tensioning protruding portion 40 is in the form of the removable tensioning protruding portion 40d of the bottom tool 18. The removable corresponding portions 116c may be removable and interchangeable. In one version, the removable tensioning protruding portion 40d is removable and interchangeable independent of a respective corresponding portion 116. In another version, the removable corresponding portion 116c is removable and interchangeable independent of a respective removable tensioning protruding portion 40d. In another version, the removable tensioning protruding portion 40d and a respective removable corresponding portion 116c are both removable and interchangeable as a set or pair. In one version, removable corresponding portions 116c are removably coupled, or attached, to the top tool outer curved surface 108, and/or to the top tool outer flange 102, or to another location on the top tool 100, via one or more attachment elements 46 (see FIG. 1) comprising one of, one or more bolts 48 (see FIG. 1), one or more screws 50 (see FIG. 1), one or more fasteners 52 (see FIG. 1), one or more clips 54 (see FIG. 1), or other suitable attachment elements.

In another version, the removable corresponding portions 116c are removably coupled, or attached, to the top tool outer curved surface 108, or to the top tool outer flange 102, or to another location on the top tool 100, via the slot and groove arrangement 56 (see FIG. 1), where the removable corresponding portion 116c has one or more slot portions 58 (see FIG. 1) that may be formed on sides 125 (see FIG. 4A), or on other suitable portions of the removable corresponding portions 116c. The one or more slot portions 58 are designed, or configured, to be inserted into one or more groove portions 60 (see FIG. 1) formed on the top tool outer flange 102 of the top tool 100, or on another suitable location of the top tool 100 or of the tensioned tooling assembly 10.

As shown in FIGS. 4A-4D, the top tool 100 further comprises a top tool web 132, or body, formed between, and integral with, the top tool outer flange 102 and a top tool inner flange 134. As shown in FIG. 4A, the top tool web 132 has a flat surface 135, or a substantially flat surface, with the arc shape 30b. As further shown in FIG. 4A, the flat surface 135 of the top tool web 132 has an outer side 136a, an inner side 136b, a first end 138a integral, or continuous, with the top end 105 of the top tool outer flange 102, and a second end 138b integral, or continuous, with a bottom end 140 of the top tool inner flange 134. As further shown in FIG. 4A, the top tool inner flange 134 comprises the bottom end 140, a top end 142, a top tool inner radius 144, and a top tool inner curved surface 145. The top tool inner curved surface 145 has the arc shape 30b (see FIG. 4A), and the top tool inner curved surface 145 is disposed between the bottom end 140 and the top end 142 and between the bottom end 140 and the top tool inner radius 144. As shown in FIG. 3A, 4A, the top tool inner curved surface 145 has an outer side 146a, or convex side. As shown in FIG. 4C, the top tool inner curved surface 145 has an inner side 146b, or concave side. The top tool inner flange 134 does not have any corresponding portions 116 or cut-out corresponding portions 122 like the top tool outer flange 102 does.

As further shown in FIG. 4D, the top tool 100 has a side profile 94a at the first side 110 and at the second side 112 of the top tool 100. The side profile 94a preferably has a substantially Z-shaped configuration 95a (see FIG. 4D).

The top tool 100 may be made of a metal material such as steel, stainless steel, aluminum, nickel-iron alloy, elastomers such as rubber, or another suitable metal or polymer material.

Now referring to FIG. 5, FIG. 5 is an illustration of a front view of an exemplary thermoplastic composite charge 16, such as a thermoplastic composite ply 16a, also referred to as a thermoplastic composite blank, used in the tensioned tooling system 12 of the disclosure. As shown in FIG. 5, the thermoplastic composite charge 16, such as the thermoplastic composite ply 16a, is curved and has an arc shape 30c and arc lengths 32, including an outer arc length 32c and an inner arc length 32d, and the thermoplastic composite charge 16 is flat, or substantially flat, in configuration or shape prior to stamp forming. The thermoplastic composite charge 16 is typically heated prior to stamp forming. The plurality of tensioning protruding portions 40 (see FIGS. 3A-3E) allow the arc length 32 (see FIG. 3A), such as the bottom tool arc length 32a, of the bottom tool 18 and the bottom tool outer curved surface 28 to match the outer arc length 32c of the thermoplastic composite charge 16. As further shown in FIG. 5, the thermoplastic composite charge 16, such as the thermoplastic composite ply 116a, has arc-shaped sides 148 and straight sides 150.

The plurality of tensioning protruding portions 40 are tailored in size based on a predetermined amount 176 (see FIG. 1) of an excess material 178 (see FIGS. 1, 8), such as an excess trim material, to be trimmed, cut, or removed from the formed thermoplastic composite part 156 (see FIG. 8), for example, from a flange 174 (see FIG. 8), such as an outer flange 174a (see FIG. 8), of the formed thermoplastic composite part 156, after formation with the thermoplastic composite stamp forming process 14 (see FIG. 1). For example, the tensioning protruding portions 40 may be tailored in size by calculating the outer arc length 32c (see FIG. 5) of the thermoplastic composite charge 16 (see FIG. 5), calculating the bottom tool arc length 32a (see FIG. 3A), and calculating the difference between the outer arc length 32c and the bottom tool arc length 32a, and adding the difference to the bottom tool arc length 32a by dividing out the excess material 178 across the tensioning protruding portions 40, so that the outer arc length 32c of the thermoplastic composite charge 16 is equal to a part arc length 32e (see FIG. 9A) of a net part 170 (see FIG. 9A), for example, a contoured curved flanged part 166 (see FIG. 9A). The maximum difference between the outer arc length 32c and the bottom tool arc length 32a is at the very edge of the thermoplastic composite charge 16 or arc-shaped side 148 (see FIG. 5). The difference in the arc lengths (between the outer arc length 32c and the bottom tool arc length 32a) decreases as it gets closer to a centerline of the thermoplastic composite charge 16. Each tensioning protruding portion 40 is preferably angled to mimic or simulate the difference in the arc lengths (between the outer arc length 32c and the bottom tool arc length 32a). The tensioning protruding portions 40 allow the net part 170, such as the contoured curved flanged part 166, to have the part arc length 32e that matches, or is equal to, the outer arc length 32c of the thermoplastic composite charge 16. The tensioning protruding portions 40 in the bottom tool 18 and the corresponding portions 116 in the top tool 100 are used to form protruding areas 168 (see FIG. 8) in the flange 174 (see FIG. 8), such as the outer flange 174a (see FIG. 8). The protruding areas 168 include the wrinkles 8 (see FIG. 8) that are removed by a material removal device 182 (see FIG. 1) and a material removal process 183 (see FIG. 1), discussed in further detail below.

The thermoplastic composite charge 16, such as the thermoplastic composite ply 116a, may be in the form of a fiber-reinforced thermoplastic composite material such as prepreg sheets. The thermoplastic composite charge 16, such as the thermoplastic composite ply 116a, may comprise polymer matrix composite materials that may include, but are not limited to, such thermoplastic composite materials as polyphenylene sulfide (PPS), polyetherimide (PEI), polyether ketone ketone (PEKK), polyether ether ketone (PEEK), or other suitable thermoplastic composite materials. This may include reinforced thermoplastic laminates, unidirectional tapes, pre-impregnated fabrics that use either carbon or glass as the primary reinforcement, fiber reinforced plastic, dry carbon fibers, pre-impregnated carbon fiber fabrics, thermoset resins, fiberglass, poly paraphenylene terephthalamide, light, strong para-aramid synthetic fibers, or another suitable polymer matrix composite material. In particular, glass fiber (GF) reinforced polyetherimide (PEI) woven fabric may be used.

Now referring to FIGS. 6A-6G, FIGS. 6A-6G show exemplary versions of a tensioned tooling assembly 10 (see FIGS. 6A, 6D-6G) with versions of a top tool 100 (see FIGS. 6A-6G) and a bottom tool 18 (see FIGS. 6A, 6D-6G), and a tensioned tooling system 12 (see FIG. 6G), of the disclosure.

FIG. 6A is an illustration of a front perspective view of an exemplary tensioned tooling assembly 10 of the disclosure in an open position 152. FIG. 6A shows the top tool 100, such as the corresponding portion tool 100a, and shows the bottom tool 18, such as the tensioning protruding portion tool 18a, of the tensioned tooling assembly 10, where the top tool 100 is positioned above, and on top of the bottom tool 18, with a gap 154 between the top tool 100 and the bottom tool 18 when the tensioned tooling assembly 10 is in the open position 152. In a preferred version, the top tool 100 is separate from the bottom tool 18 and is not connected to the bottom tool 18. The top tool 100 and the bottom tool 18 have locating features or indexing features, such as markings or other suitable locating or indexing features, to enable and ensure the top tool 100 and the bottom tool 18 are aligned to each other.

As shown in FIG. 6A, the top tool 100 includes the top tool outer flange 102 with the corresponding portions 116 comprising the first corresponding portions 116a and the second corresponding portions 116*b* in the form of cut-out corresponding portions 122, such as first cut-out corresponding portions 122*a* and second cut-out corresponding portions 122*b*. The corresponding portions 116 are adjacent to, and positioned between, top tool outer flange segments 102*a* (see FIG. 6A).

As further shown in FIG. 6A, the bottom tool 18 includes the bottom tool outer flange 20 with the tensioning protruding portions 40 comprising the first tensioning protruding portions 40*a* and the second tensioning protruding portions 40*b*, for example, in the form of integral tensioning protruding portions 40*c*. The tensioning protruding portions 40 are adjacent to, and positioned between, bottom tool outer flange segments 20*a* (see FIG. 6A).

FIG. 6B is an illustration of an enlarged front perspective view of the corresponding portion 116, in the form of the cut-out corresponding portion 122, of the top tool 100 of the tensioned tooling assembly 10 of FIG. 6A. As shown in FIG. 6B, the corresponding portion 116, such as the cut-out corresponding portion 122, is adjacent to, and positioned between, top tool outer flange segments 102*a* of the top tool outer flange 102.

FIG. 6C is an illustration of an enlarged front perspective view of another version of a corresponding portion 116, in the form of a protruding corresponding portion 128, of the top tool 100 of a tensioned tooling assembly 10 (see FIG. 1). As shown in FIG. 6C, the corresponding portion 116, such as the protruding corresponding portion 128, is adjacent to, and positioned between, top tool outer flange segments 102*a* of the top tool outer flange 102. As shown in FIG. 6C, in this version, the protruding corresponding portion 128 has a protruding shape 130, rather than a cut-out, that corresponds to or matches the shape and size of a respective tensioning protruding portion 40 on the bottom tool 18, when the top tool 100 is nested over the bottom tool 18. As shown in FIG. 6C, the top tool outer curved surface 108 comprises a fully tooled top tool outer curved surface 108*a*.

FIG. 6D is an illustration of a front perspective view of an exemplary tensioned tooling assembly 10 of the disclosure in a closed position 155, showing the top tool 100 nested over the bottom tool 18, and in particular, the top tool outer flange 102 nested over the bottom tool outer flange 20, with the tensioning protruding portions 40 spaced apart on, and outwardly extending from, the bottom tool outer curved surface 28 (see also FIG. 3E) of the bottom tool outer flange 20. As shown in FIG. 6D, in this version, the bottom tool 18 has tensioning protruding portions 40 in the form of integral tensioning protruding portions 40*c*, and also has a removable tensioning protruding portion 40*d* that is removable from the bottom tool 18 and that may be interchangeable with other bottom tools 18. FIG. 6D also shows of the top tool 100 with the top tool outer flange 102 having the corresponding portions 116, in the form of the cut-out corresponding portions 122. FIG. 6D further shows the top tool outer flange segments 102*a* of the top tool outer flange 102.

FIG. 6E is an illustration of an enlarged front perspective view of circle 6E of FIG. 6D showing the tensioning protruding portion 40 in the form of the removable tensioning protruding portion 40*d* of the bottom tool 18 of the tensioned tooling assembly 10 of FIG. 6D. The removable tensioning protruding portion 40*d* is removable from the bottom tool outer flange 20 of the bottom tool 18 and interchangeable with other bottom tools 18. FIGS. 6D, 6E show broken lines around the perimeter of the removable tensioning protruding portion 40*d* to indicate the removability and attachment of the removable tensioning protruding portion 40*d*. In this version, as shown in FIGS. 6D, 6E, the removable tensioning protruding portion 40*d* is removably coupled, or attached, to the bottom tool outer curved surface 28, and/or to the bottom tool outer flange 20, or to another location on the bottom tool 18, via attachment elements 46 comprising bolts 48. FIGS. 6D, 6E show, in one version, an exemplary positioning of the attachment element 46, such as the bolt 48. In another version, the attachment element 46, such as the bolt 48, may be countersunk into the surface and positioned in other locations on the bottom tool 18. Alternatively, the attachment elements 46 may comprise, as shown in FIG. 1, one or more screws 50, one or more fasteners 52, one or more clips 54, or other suitable attachment elements. Alternatively, the removable tensioning protruding portion 40*d* may be removably coupled, or attached, to the bottom tool outer curved surface 28, and/or to the bottom tool outer flange 20, or to another location on the bottom tool 18, via the slot and groove arrangement 56 (see FIG. 1), or via another suitable attachment means.

FIG. 6E further shows the top tool 100 with the top tool outer flange 102, the top tool outer flange segments 102*a*, and the corresponding portion 116, in the form of the cut-out corresponding portion 122. The corresponding portion 116, in the form of the cut-out corresponding portion 122 (see FIG. 6E), or in the form of the protruding corresponding portion 128 (see FIG. 6C), may also be configured, or designed, to be a removable corresponding portion 116*c* (see FIG. 1) that is removable from the top tool outer flange 102 of the top tool 100, and in particular, when the respective tensioning protruding portion 40 is in the form of the removable tensioning protruding portion 40*d* of the bottom tool 18.

FIG. 6F is an illustration of an enlarged front perspective view of an exemplary tensioned tooling system 12 with the tensioned tooling assembly 10 of the disclosure, in the closed position 155. FIG. 6F further shows a formed thermoplastic composite part portion 156*a* of a formed thermoplastic composite part 156, having an initial geometry 158*a* in an untrimmed form 160 after formation with the tensioned tooling assembly 10 and the tensioned tooling system 12, using a thermoplastic composite stamp forming process 14 (see FIG. 1). FIG. 6F further shows the top tool 100 with the top tool outer flange 102, the top tool outer flange segments 102*a*, and the corresponding portion 116, in the form of the cut-out corresponding portion 122. FIG. 6F further shows the bottom tool 18 with the tensioning protruding portion 40.

FIG. 6G is an illustration of a front perspective view of an exemplary tensioned tooling system 12 with the tensioned tooling assembly 10 of FIG. 6A in the closed position 155, and showing a thermoplastic composite charge 16 positioned between the top tool 100 and the bottom tool 18, such as over the bottom tool 18 and under the top tool 100. With the thermoplastic composite stamp forming process 14, the thermoplastic composite charge 16 is formed into the formed thermoplastic composite part 156, as shown in FIG. 6F, with the initial geometry 158*a* in the untrimmed form 160. Although the formed thermoplastic composite part 156 is formed with the initial geometry 158*a* in the untrimmed form 160, FIG. 6G shows the formed thermoplastic composite part 156 in broken lines with the final geometry 158*b* in the trimmed form 162, to show how part cut-out portions 164, such as in the form of mousehole shaped portions 165, of the formed thermoplastic composite part 156 match or correspond to the locations of the tensioning protruding portions 40 of the bottom tool 18 and to the locations of the corresponding portions 116, such as the cut-out corresponding portions 122, of the top tool 100. As shown in FIG. 6G, the formed thermoplastic composite part 156 outlined in broken lines may comprise a contoured curved flanged part 166.

During the thermoplastic composite stamp forming process 14 (see FIG. 1), the thermoplastic composite charge 16 (see FIG. 6G) is pressed between the bottom tool outer flange 20 (see FIG. 6G) of the bottom tool 18 and the top tool outer flange 102 (see FIG. 6G) of the top tool 100. As shown in FIG. 6G, the plurality of tensioning protruding portions 40 push first portions 16b of the one or more thermoplastic composite charges 16, or stacked thermoplastic composite plies, outwardly, controlling or directing where the wrinkles 8 form in the first portions 16b of the one or more thermoplastic composite charges 16. The first portions 16b are in contact with all, or part, of the outer face 64 and the side faces 70 of each tensioning protruding portion 40. The tensioning protruding portions 40, or tensioning bump-out features, direct, push, and converge material bulk or ply waviness to the first portions 16b of the one or more thermoplastic composite charges 16, such as the one or more thermoplastic composite plies 16a, or stacked thermoplastic composite plies. As further shown in FIG. 6G, as the plurality of tensioning protruding portions 40 direct, push, and converge the material bulk or ply waviness at and to the first portions 16b of the one or more thermoplastic composite charges 16, the plurality of tensioning protruding portions 40 also apply tension 167 (see FIG. 1) to second portions 16c of the one or more thermoplastic composite charges 16 located adjacent to the first portions 16b, and the second portions 16c are pressed or clamped between the top tool outer flange segments 102a and the bottom tool outer flange segments 20a. The second portions 16c remain after forming of the formed thermoplastic composite part 156. Thus, the tensioning protruding portions 40, such as the tensioning bump-out features, of the bottom tool 18 direct or push the thermoplastic composite charge 16 material outwards at the first portions 16b, which become protruding areas 168 (see FIG. 8), or specific areas, of the formed thermoplastic composite part 156, causing the wrinkles 8 or ply waves, of the thermoplastic composite charge 16 material to form or congregate in the first portions 16b of the one or more thermoplastic composite charges 16, where the first portions 16b become, or form into, protruding areas 168 (see FIG. 8) in the formed thermoplastic composite part 156, where the material of the protruding areas 168 is trimmed away, cut out, or otherwise removed from the formed thermoplastic composite part 156 to form a net part 170, or a final formed part.

The tensioned tooling assembly 10 (see FIGS. 1, 6G) and the tensioned tooling system 12 (see FIGS. 1, 6G) provide a means to control and direct formation of wrinkles 8 (see FIG. 6G) to specific areas, such as the first portions 16b (see FIG. 6G), which become the protruding areas 168 (see FIG. 8) that are configured or designed to be trimmed, cut, or removed from the formed thermoplastic composite part 156 (see FIG. 9A) having curved contours or angles, for example, the contoured curved flanged part 166 (see FIG. 9A), such as the aircraft contoured curved flanged part 166a (see FIG. 9A), for fuselage 222 (see FIG. 2), wings 224 (see FIG. 2), and other aircraft parts 157 (see FIG. 1), in the thermoplastic composite stamp forming process 14 (see FIG. 1), such as the thermoplastic composite hot stamp forming process 14a (see FIG. 1). This results in removal of the wrinkles 8 (see FIGS. 6G, 8) in the net part 170 (see FIG. 9A), or the final formed part.

After forming of the formed thermoplastic composite part 156 from the thermoplastic composite charge 16 using the tensioned tooling system 12 with the tensioned tooling assembly 10 and the thermoplastic composite stamp forming process 14 (see FIG. 1), the first portions 16b with the wrinkles 8 (see FIG. 6G) of the thermoplastic composite charge 16, which first portions 16b become the protruding areas 168 (see FIG. 8) with the wrinkles 8 (see FIG. 8) of the formed thermoplastic composite part 156, are removed from the formed thermoplastic composite part 156, with trimming, cutting, or another suitable removal process, to obtain the net part 170 (see FIG. 9A). Such trimming, cutting, or other suitable removal of the first portions 16b with the wrinkles 8 of the thermoplastic composite charge 16, which first portions 16b become the protruding areas 168 (see FIG. 8) with the wrinkles 8 (see FIG. 8) of the formed thermoplastic composite part 156 (see FIG. 8), results in the elimination of the wrinkles 8 (see FIGS. 6G, 8), or wrinkle elimination 172 (see FIG. 1), in the formed thermoplastic composite part 156, for example, in a flange 174 (see FIG. 9A), such as an outer flange 174a (see FIG. 9A) of the contoured curved flanged part 166 (see FIG. 9A). The tensioning protruding portions 40, or tensioning bump-out features, on the bottom tool 18 eliminate composite material wrinkling in the net part 170 (see FIG. 9A), for example, the flange 174, such as the outer flange 174a, of the contoured curved flanged part 166. The plurality of tensioning protruding portions 40 are tailored in size based on a predetermined amount 176 (see FIG. 1) of an excess material 178 (see FIG. 1), such as an excess trim material, to be trimmed, cut, or removed from the formed thermoplastic composite part 156, for example, the contoured curved flanged part 166, after formation with the thermoplastic composite stamp forming process 14.

Figure 7:
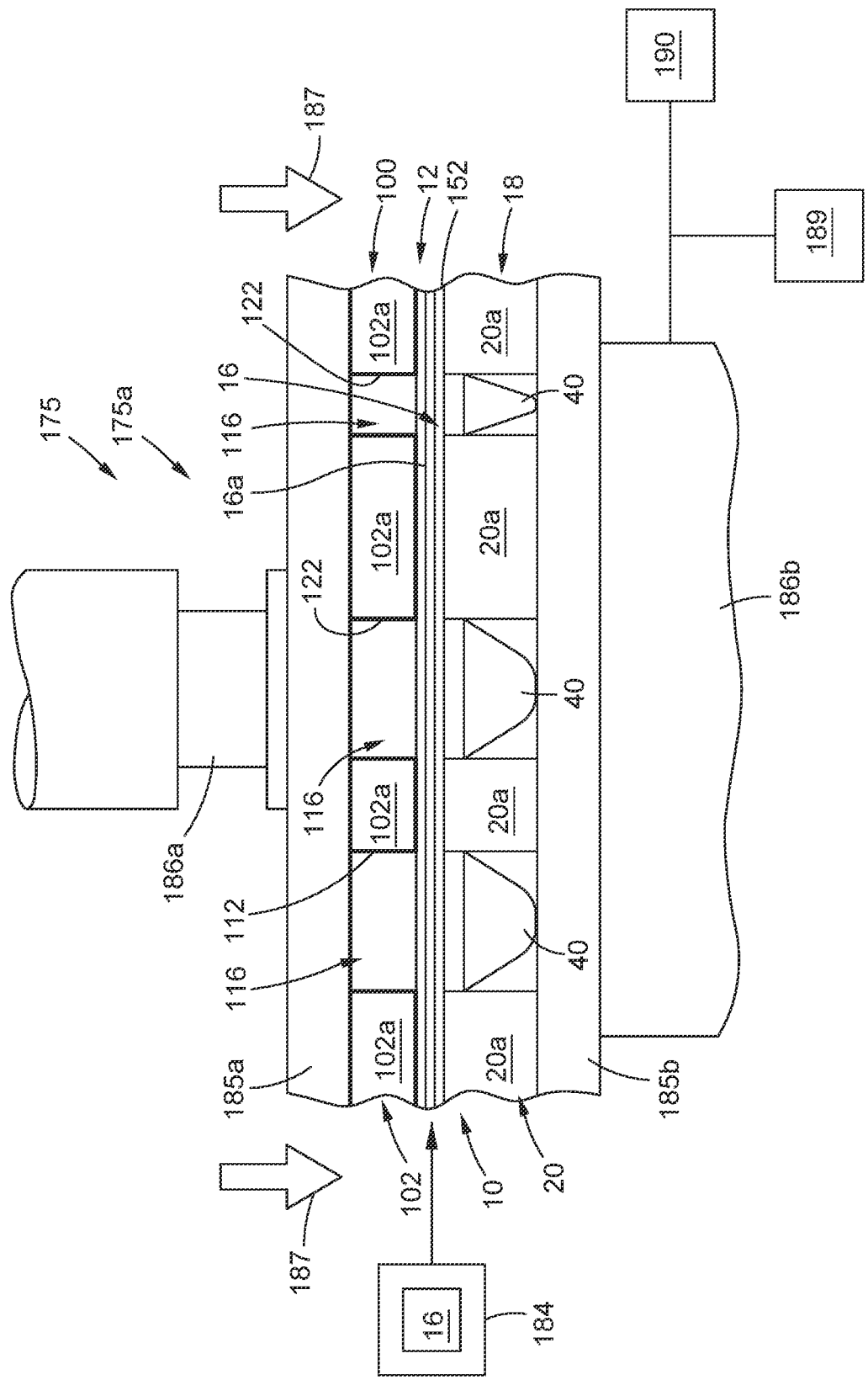
FIG. 7 is an illustration of a front perspective view of an exemplary thermoplastic composite stamp forming apparatus incorporating an exemplary tensioned tooling system of the disclosure having an exemplary tensioned tooling assembly in an open position, and showing exemplary thermoplastic composite plies positioned between a top tool and a bottom tool.

Now referring to FIG. 7, FIG. 7 is an illustration of a front perspective view of an exemplary version of a thermoplastic composite stamp forming apparatus 175, such as a thermoplastic composite hot stamp forming apparatus 175a, incorporating an exemplary tensioned tooling system 12 of the disclosure and having an exemplary tensioned tooling assembly 10 and showing three (3) thermoplastic composite charges 16, or thermoplastic composite plies 16a, such as stacked thermoplastic composite plies, positioned between the top tool 100 and the bottom tool 18 of the tensioned tooling assembly 10. Although three (3) thermoplastic composite charges 16, or thermoplastic composite plies 16a, such as stacked thermoplastic composite plies, are shown in FIG. 7, two (2), or more than three (3), thermoplastic composite charges 16, or thermoplastic composite plies 16a, such as stacked thermoplastic composite plies, may be used. As shown in FIG. 7, the tensioned tooling assembly 10 is in the open position 152. The thermoplastic composite stamp forming apparatus 175, such as the thermoplastic composite hot stamp forming apparatus 175a, uses the thermoplastic composite stamp forming process 14 (see FIG. 1), such as the thermoplastic composite hot stamp forming process 14a (see FIG. 1), to form the thermoplastic composite charge 16 into the formed thermoplastic composite part 156 (see FIGS. 6G, 8).

As shown in FIG. 7, the top tool 100 comprises the top tool outer flange 102 with the top tool outer flange segments 102a, and the corresponding portions 116, such as the cut-out corresponding portions 122. As further shown in FIG. 7, the bottom tool 18 comprises the bottom tool outer flange 20 with the bottom tool outer flange segments 20a, and the tensioning protruding portions 40. As shown in FIG. 7, the top tool 100 is coupled to a first stamping plate 185a, which is coupled to an upper portion 186a, such as an upper arm portion, of the thermoplastic composite stamp forming apparatus 175. As further shown in FIG. 7, the bottom tool 18 is coupled to a second stamping plate 185b, which is coupled to a lower portion 186b, such as a lower base portion, of the thermoplastic composite stamp forming apparatus 175.

As shown in FIG. 7, with the thermoplastic composite stamp forming process 14 (see FIG. 1) comprising the thermoplastic composite hot stamp forming process 14a (see FIG. 1), the thermoplastic composite charge 16 in a flat configuration is preferably initially heated with, and in, a heating element 184, such as an oven, for example, an infrared oven, or another suitable heating element, to heat the thermoplastic composite charge 16 at a heat 180 (see FIG. 1) in a temperature range of 300 degrees Fahrenheit (149 degrees Celsius) to 500 degrees Fahrenheit (260 degrees Celsius) for an effective time at a time period in a range of 2 (two) minutes to 10 (ten) minutes.

The thermoplastic composite charge 16 that is sufficiently heated is then moved or transferred into the thermoplastic composite stamp forming apparatus 175, such as the thermoplastic composite hot stamp forming apparatus 175a, and positioned between the top tool 100 and the bottom tool 18. In this version of the thermoplastic composite stamp forming apparatus 175, the top tool 100 is configured to move downwardly in a downward direction 187 (see FIG. 7) to apply pressure against the thermoplastic composite charge 16 that is heated and to apply pressure against the bottom tool 18, in order to press and form the thermoplastic composite charge 16 into the formed thermoplastic composite part 156. Preferably, a pressure 188 (see FIG. 1) applied with the thermoplastic composite stamp forming apparatus 175 to the thermoplastic composite charge 16 is in a range of from about 250 (two hundred fifty) psi (pounds per square inch) to about 1000 (one thousand) psi, and is dependent on the type of materials comprising the thermoplastic composite charge 16 and the type of materials comprising the top tool 100 and the bottom tool 18. The pressure 188 is applied for an effective time at a time period in a range of 2 (two) minutes to 5 (five) minutes, and is dependent on the type of materials comprising the thermoplastic composite charge 16 and the type of materials comprising the top tool 100 and the bottom tool 18.

Figure 8:
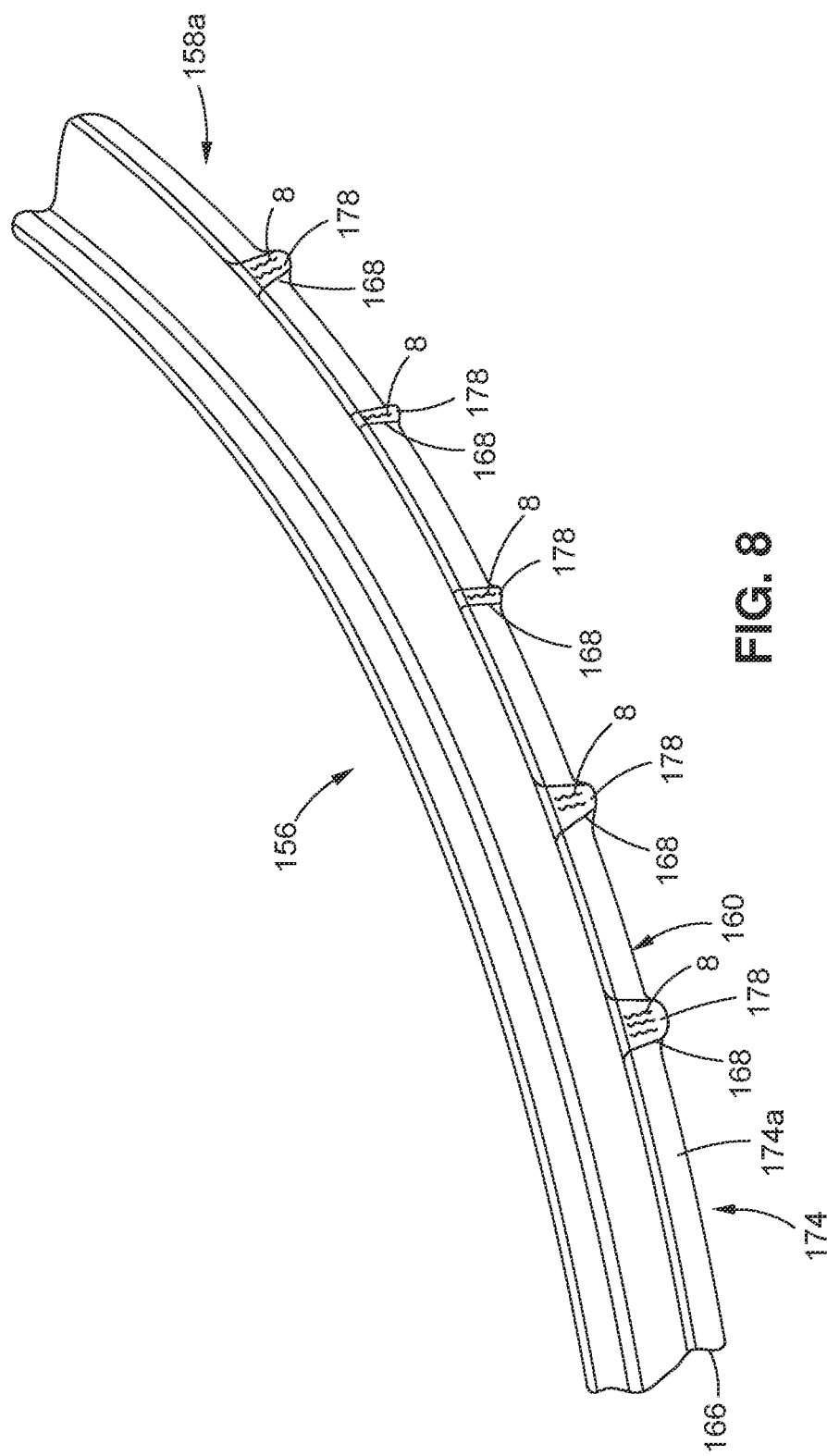
FIG. 8 is an illustration of a front perspective view of an exemplary formed thermoplastic composite part with an initial geometry in an untrimmed form.

As shown in FIG. 7, the thermoplastic composite stamp forming apparatus 175, such as the thermoplastic composite hot stamp forming apparatus 175a, further comprises a controller 189 coupled to the thermoplastic composite stamp forming apparatus 175, such as the thermoplastic composite hot stamp forming apparatus 175a, for controlling the components of the thermoplastic composite stamp forming apparatus 175, such as the thermoplastic composite hot stamp forming apparatus 175a. As shown in FIG. 7, the thermoplastic composite stamp forming apparatus 175, such as the thermoplastic composite hot stamp forming apparatus 175a, further comprises a power source 190 coupled to the thermoplastic composite stamp forming apparatus 175, such as the thermoplastic composite hot stamp forming apparatus 175a, for providing power to the components of the thermoplastic composite stamp forming apparatus 175, such as the thermoplastic composite hot stamp forming apparatus 175a Now referring to FIG. 8, FIG. 8 is an illustration of a front perspective view of an exemplary formed thermoplastic composite part 156 with an initial geometry 158a in an untrimmed form 160 after formation with the thermoplastic composite stamp forming apparatus 175 (see FIG. 7), such as the thermoplastic composite hot stamp forming apparatus 175a (see FIG. 7), having the tensioned tooling system 12 (see FIGS. 1, 6G, 7) with the tensioned tooling assembly 10 (see FIGS. 1, 6G, 7) of the disclosure, and using the thermoplastic composite stamp forming process 14 (see FIG. 1), such as the thermoplastic composite stamp forming process 14a (see FIG. 1). The formed thermoplastic composite part 156 in the untrimmed form 160 is prior to trimming, cutting, or another suitable removal process using a material removal device 182 (see FIG. 1), such as a trimming device, a cutting device, or another suitable material removal device.

As shown in FIG. 8, in this version, the formed thermoplastic composite part 156 is comprised of three (3) thermoplastic composite plies 16a that are stacked. However, in other versions, the formed thermoplastic composite part 156 may be comprised of two (2), or more than three (3), thermoplastic composite plies 16a that are stacked.

As shown in FIG. 8, the formed thermoplastic composite part 156 with the initial geometry 158a in the untrimmed form 160 includes the protruding areas 168 along the flange 174, such as the outer flange 174a, of the formed thermoplastic composite part 156. The protruding areas 168 substantially match the size and shape of the respective tensioning protruding portions 40 (see FIGS. 6G, 7) of the bottom tool 18 (see FIGS. 6G, 7).

The protruding areas 168 are pushed out or formed on the thermoplastic composite charge 16 (see FIGS. 6G, 7) by the tensioning protruding portions 40 (see FIGS. 6G, 7), or tensioning bump-out features, during the thermoplastic composite stamp forming process 14 (see FIG. 1), such as the thermoplastic composite hot stamp forming process 14a (see FIG. 1), and the material bulk or ply waviness of the thermoplastic composite charge 16 causes the wrinkles 8 which congregate at the first portions 16b (see FIG. 6G) of the thermoplastic composite charge 16, which become the protruding areas 168 with the wrinkles 8. The first portions 16b of the thermoplastic composite charge 16 that become the protruding areas 168 (see FIG. 8) of the formed thermoplastic composite part 156 are removed by a material removal process 183 (see FIG. 1), such as trimming, cutting, or another suitable material removal process, using a material removal device 182 (see FIG. 1), such as a trimming device, a cutting device, or another suitable material removal device. Exemplary material removal processes 183 and material removal devices 182 may include a CNC (computer numerical control) machining process and a CNC (computer numerical control) machine, a waterjet cutting process and a waterjet cutter, or another suitable material removal process and material removal device.

Now referring to FIGS. 9A-9C, FIGS. 9A-9C show an exemplary version of a formed thermoplastic composite part 156 with a final geometry 158b in a trimmed form 162 after formation with the thermoplastic composite stamp forming apparatus 175 (see FIG. 7), such as the thermoplastic composite hot stamp forming apparatus 175a (see FIG. 7), having the tensioned tooling system 12 (see FIGS. 1, 6G, 7) with the tensioned tooling assembly 10 (see FIGS. 1, 6G, 7) of the disclosure, using the thermoplastic composite stamp forming process 14 (see FIG. 1), such as the thermoplastic composite stamp forming process 14a (see FIG. 1), and after using a material removal process 183, such as trimming, cutting, or removing the protruding areas 168 (see FIG. 8) with the wrinkles 8 (see FIG. 8) from the formed thermoplastic composite part 156, and using a material removal device 182 (see FIG. 1), such as a trimming device, a cutting device, or another suitable material removal device.

FIG. 9A is an illustration of a front perspective view of the exemplary formed thermoplastic composite part 156 with the final geometry 158b in the trimmed form 162. FIG. 9B is an illustration of a back view of the formed thermoplastic composite part 156 of FIG. 9A. FIG. 9C is an illustration of a right side back perspective view of the formed thermoplastic composite part 156 of FIG. 9A. As shown in FIGS. 9A-9C, in this version, the formed thermoplastic composite part 156 comprises the net part 170 in the form of the contoured curved flanged part 166, such as an aircraft contoured curved flanged part 166a, for a fuselage 222 (see FIG. 12) of an aircraft 220 (see FIG. 12), for example, a circumferential frame component that supports the circumference of the fuselage 222. The contoured curved flanged part 166 may be a high contour curved flanged part. FIG. 9A further shows the arc length 32, such as the part arc length 32e, of the formed thermoplastic composite part 156, such as the net part 170 (see FIG. 9A), for example, the contoured curved flanged part 166 (see FIG. 9A). The part arc length 32e (see FIG. 9A) matches, or is equal to, the outer arc length 32c (see FIG. 5) of the thermoplastic composite charge 16 before it undergoes the thermoplastic composite stamp forming process 14 (see FIG. 1).

After the protruding areas 168 (see FIG. 8) with the wrinkles 8 (see FIG. 8) are removed with the material removal device 182 (see FIG. 1) and the material removal process 183 (see FIG. 1), the formed thermoplastic composite part 156 with the final geometry 158b in the trimmed form 162 is free of the wrinkles 8 (see FIG. 8), and the tensioned tooling assembly 10 with the tensioning protruding portions 40 on the bottom tool 18 and the corresponding portions 116 on the top tool 100 provide for wrinkle elimination 172 in the net part 170 such as the formed thermoplastic composite part 156.

As shown in FIGS. 9A-9C, the formed thermoplastic composite part 156, such as the contoured curved flanged part 166, for example, the aircraft contoured curved flanged 166a, comprises the flange 174, such as the outer flange 174a, with the part cut-out portions 164, such as in the form of mousehole shaped portions 165.

As shown in FIG. 9A, the part cut-out portions 164 comprise first part cut-out portions 164a and second part cut-out portions 164b. In one version, as shown in FIG. 9A, the flange 174, such as the outer flange 174a, has five (5) part cut-out portions 164, including three (3) first part cut-out portions 164a and two (2) second part cut-out portions 164b, alternating between six (6) flange segments 192. In other versions, depending on the formed thermoplastic composite part 156 (see FIG. 9A) that is formed, the number of part cut-out portions 164, including the number of first part cut-out portions 164a and the second part cut-out portions 164b, may be one (1) to four (4) or greater than five (5), and the number of flange segments 192 may be two (2) to five (5) or greater than six (6).

The part cut-out portions 164, such as the first part cut-out portions 164a and the second part cut-out portions 164b, each has a part cut-out portion width 42c (see FIG. 9B), and the part cut-out portion widths 42c of the part cut-out portions 164 may vary, such as one or more varying part cut-out portion widths 42c.

In one version, as shown in FIG. 9B, the part cut-out portion width 42c of the first part cut-out portion 164a is greater than the part cut-out portion width 42c of the second part cut-out portion 164b. In this version of the formed thermoplastic composite part 156, the first part cut-out portions 164a are larger in the part cut-out portion width 42c and larger in size than the part cut-out portion width 42c and the size of the second part cut-out portion 164b. In other versions, all of the tensioning protruding portions 40 may be of equal width and equal size, all of the part cut-out portions 164 may be of different widths and different sizes, or the part cut-out portions 164 may be a combination of varying widths and sizes. The part cut-out width 42c of each part cut-out portion 164 substantially corresponds to, or matches, the width 42 (see FIG. 3B) of each respective tensioning protruding portion 40 of the bottom tool 18.

As further shown in FIG. 9B, the part cut-out portions 164, such as the first part cut-out portions 164a and the second part cut-out portions 164b, each has a part cut-out portion height 44d (see FIG. 9B), that is equal, or substantially equal. The part cut-out height 44d of each part cut-out portion 164 substantially corresponds to, or matches, the height 44 (see FIG. 3B) of each respective tensioning protruding portion 40 of the bottom tool 18.

As shown in FIGS. 9A-9C, the formed thermoplastic composite part 156 in the form of the contoured curved flanged part 166, such as the aircraft contoured curved flanged part 166a, further comprises a web 193, or body, formed between, and integral with, the outer flange 174a and an inner flange 194. As shown in FIG. 9B, the formed thermoplastic composite part 156 in the form of the contoured curved flanged part 166, such as the aircraft contoured curved flanged part 166a, has an arc shape 30d. As further shown in FIG. 9A, the formed thermoplastic composite part 156 in the form of the contoured curved flanged part 166, such as the aircraft contoured curved flanged part 166a, has an outer radius 195 and an inner radius 196.

Now referring to FIG. 9D, FIG. 9D is an illustration of an enlarged right side view of circle 9D of FIG. 9C showing a side profile 94b view of the formed thermoplastic composite part 156, in the form of the contoured curved flanged part 166, such as the aircraft contoured curved flanged part 166a, of FIG. 9C.

As shown in FIG. 9C, the side profile 94b is at a first side 197a of the formed thermoplastic composite part 156, in the form of the contoured curved flanged part 166, such as the aircraft contoured curved flanged part 166a. FIG. 9C further shows a second side 197b of the formed thermoplastic composite part 156, in the form of the contoured curved flanged part 166, such as the aircraft contoured curved flanged part 166a. In one version, as shown in FIG. 9B, a straight line distance 199 from the first side 197a to the second side 197b is 60 inches (152.4 centimeters). However, in other versions, the straight line distance 199 may be greater than 60 inches or less than 60 inches.

As shown in FIG. 9D, the side profile 94b preferably has a substantially Z-shaped configuration 95b with vertical portions 96a corresponding to the outer flange 174a (see FIG. 9C) and the inner flange 194 (see FIG. 9C) and a horizontal portion 98a corresponding to the web 193 (see FIG. 9C) and connected between ends of the vertical portions 96. As shown in FIG. 9D, the vertical portion 96a corresponding to the outer flange 174a (see FIG. 9C) has a height measurement 198a, for example, in one version, of 1.5 inches (3.8 centimeters). As further shown in FIG. 9D, the vertical portion 96a corresponding to the inner flange 194 (see FIG. 9C) has a height measurement 198b, for example, in one version, of 1.6 inches (4.1 centimeters). As further shown in FIG. 9D, the horizontal portion 98a corresponding to the web 193 (see FIG. 9C) has a length measurement 198c, for example, in one version, of 4 inches (10.2 centimeters).

Figure 10:
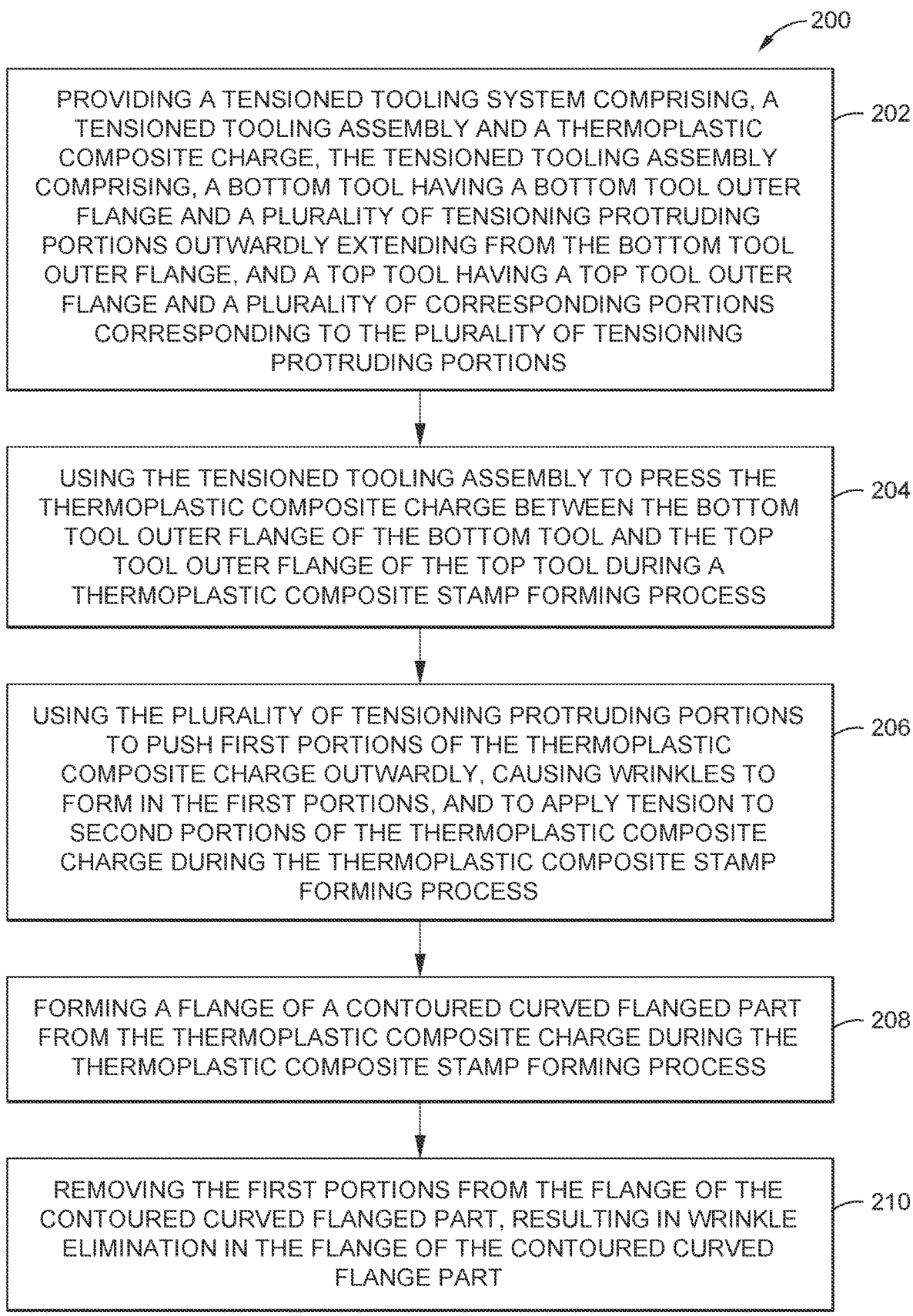
FIG. 10 is an illustration of a flow diagram of an exemplary method of the disclosure.

Now referring to FIG. 10, FIG. 10 is an illustration of a flow diagram of an exemplary version of a method 200 of the disclosure. In another version of the disclosure, there is provided the method 200 of using a tensioned tooling system 12 (see FIGS. 1, 6B) for a thermoplastic composite stamp forming process 14 (see FIG. 1), such as a thermoplastic composite hot stamp forming process 14*a* (see FIG. 1) to eliminate wrinkles 8 (see FIG. 1) and provide for wrinkle elimination 172 (see FIG. 1) in a formed thermoplastic composite part 156 (see FIGS. 6G, 8), for example, a flange 174 (see FIG. 9A), such as an outer flange 174*a* (see FIG. 9A), of a contoured curved flanged part 166 (see FIG. 9A). The thermoplastic composite stamp forming process 14 (see FIG. 1) preferably comprises a thermoplastic composite hot stamp forming process 14*a* using heat 180 (see FIG. 1) in a temperature range of 300 degrees Fahrenheit (149 degrees Celsius) to 500 degrees Fahrenheit (260 degrees Celsius).

The blocks in FIG. 10 represent operations and/or portions thereof, or elements, and lines connecting the various blocks do not imply any particular order or dependency of the operations or portions thereof, or elements. FIG. 10 and the disclosure of the steps of the method 200 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 10, the method 200 comprises the step of providing 202 the tensioned tooling system 12 (see FIGS. 1, 6G). The tensioned tooling system 12 comprises a tensioned tooling assembly 10 (see FIGS. 1, 6A). The tensioned tooling assembly 10 comprises a bottom tool 18 (see FIGS. 3A-3E). The bottom tool 18 comprises a bottom tool outer flange 20 (see FIGS. 3A-3E) having a bottom end 22 (see FIG. 3A), a top end 24 (see FIG. 3A), a bottom tool outer radius 26 (see FIG. 3A), and a bottom tool outer curved surface 28 (see FIG. 3A). The bottom tool 18, including the bottom tool outer radius 26 and the bottom tool outer curved surface 28, has an arc length 32 (see FIG. 3A), or arc span, such as a bottom tool arc length 32*a* (see FIG. 3A), or bottom tool arc span, and disposed between the bottom end 22 and the bottom tool outer radius 26. The bottom tool 18 further comprises a plurality of tensioning protruding portions 40 (see FIGS. 3A-3E) spaced apart on, and outwardly extending from, the bottom tool outer curved surface 28 (see FIGS. 3A-3E) of the bottom tool outer flange 20. Each tensioning protruding portion 40 defines an angle 62 (see FIG. 3E) formed from the bottom tool outer radius 26 to the bottom end 22 of the bottom tool outer flange 20.

The tensioned tooling assembly 10 further comprises a top tool 100 (see FIGS. 4A-4D). The top tool 100 comprises a top tool outer flange 102 (see FIGS. 4A-4D) having a bottom end 104 (see FIG. 4A), a top end 105 (see FIG. 4A), a top tool outer radius 106 (see FIG. 4A), and a top tool outer curved surface 108 (see FIG. 4A) disposed between the bottom end 104 and the top tool outer radius 106. The top tool 100 further comprises a plurality of corresponding portions 116 (see FIGS. 4A-4D) formed in, and spaced apart on, the top tool outer curved surface 108. The plurality of corresponding portions 116 correspond to the plurality of tensioning protruding portions 40 (see FIGS. 3A-3E).

The tensioned tooling system 12 further comprises a thermoplastic composite charge 16 (see FIGS. 1, 5), such as a thermoplastic composite ply 16*a* (see FIGS. 1, 5), having an arc shape 30*c*, an outer arc length 32*c* (see FIG. 5), and an inner arc length 32*d* (see FIG. 5).

As shown in FIG. 10, the method 200 further comprises the step of using 204 the tensioned tooling assembly 10 to press or compress the thermoplastic composite charge 16 between the bottom tool outer flange 20 of the bottom tool 18 and the top tool outer flange 102 of the top tool 100 during the thermoplastic composite stamp forming process 14.

As shown in FIG. 10, the method 200 further comprises the step of using 206 the plurality of tensioning protruding portions 40 to push first portions 16*b* of the thermoplastic composite charge 16 outwardly, causing wrinkles 8 (see FIG. 1) to form in the first portions 16*b*, and to apply tension 167 (see FIG. 1) to second portions 16*c* (see FIG. 1) of the thermoplastic composite charge 16 during the thermoplastic composite stamp forming process 14. The step of using 206 the plurality of tensioning protruding portions 40 to push the first portions 16*b* (see FIG. 6G) of the thermoplastic composite charge 16 (see FIGS. 5, 6G) outwardly further comprises, using the plurality of tensioning protruding portions 40 (see FIGS. 3A, 6G) to allow the arc length 32 (see FIG. 3A), such as the bottom tool arc length 32*a* (see FIG. 3A), of the bottom tool outer curved surface 28 (see FIG. 3A) of the bottom tool outer flange 20 (see FIG. 3A) of the bottom tool 18 (see FIG. 3A) to match the outer arc length 32*c* (see FIG. 5) of the thermoplastic composite charge 16 (see FIG. 5).

As shown in FIG. 10, the method 200 further comprises the step of forming 208 the flange 174 (see FIG. 9A), such as the outer flange 174*a* (see FIG. 9A), of the contoured curved flanged part 166 (see FIG. 9A) from the thermoplastic composite charge 16 (see FIGS. 5, 6G) during the thermoplastic composite stamp forming process 14 (see FIG. 1). The step of forming 208 the flange 174, such as the outer flange 174*a*, of the contoured curved flanged part 166 further comprises, forming the flange 174, such as the outer flange 174*a*, of the contoured curved flanged part 166 (see FIG. 9A) comprising an aircraft contoured curved flanged part 166*a* (see FIGS. 1, 9A) for one or more of, a fuselage 222 (see FIG. 2), a wing 224 (see FIG. 2), an empennage 228 (see FIG. 2), a tail 228*a* (see FIG. 2), a horizontal stabilizer 230, a vertical stabilizer 232, or another suitable part of an aircraft 220 (see FIG. 2).

As shown in FIG. 10, the method 200 further comprises the step of removing 210 the first portions 16*b* from the flange 174, such as the outer flange 174*a*, of the contoured curved flanged part 166, resulting in the elimination of wrinkles 8 (see FIG. 1), or wrinkle elimination 172 (see FIG. 1), in the flange 174, such as the outer flange 174*a*, of the contoured curved flanged part 166. The step of removing 210 the first portions 16*b* from the flange 174, such as the outer flange 174*a*, of the contoured curved flanged part 166 further comprises, trimming the first portions 16*b* with the wrinkles 8 (see FIGS. 6G, 8) from the flange 174, such as the outer flange 174*a*, of the contoured curved flanged part 166, to obtain part cut-out portions 164 (see FIG. 9A) each having a part cut-out portion width 42*c* (see FIG. 9B) and a part cut-out height 44*d* (see FIG. 9B) substantially corresponding to a width 42 (see FIG. 3B) and a height 44 (see FIG. 3B) of each respective plurality of tensioning protruding portions 40 (see FIG. 3B).

Figures 11, 12:
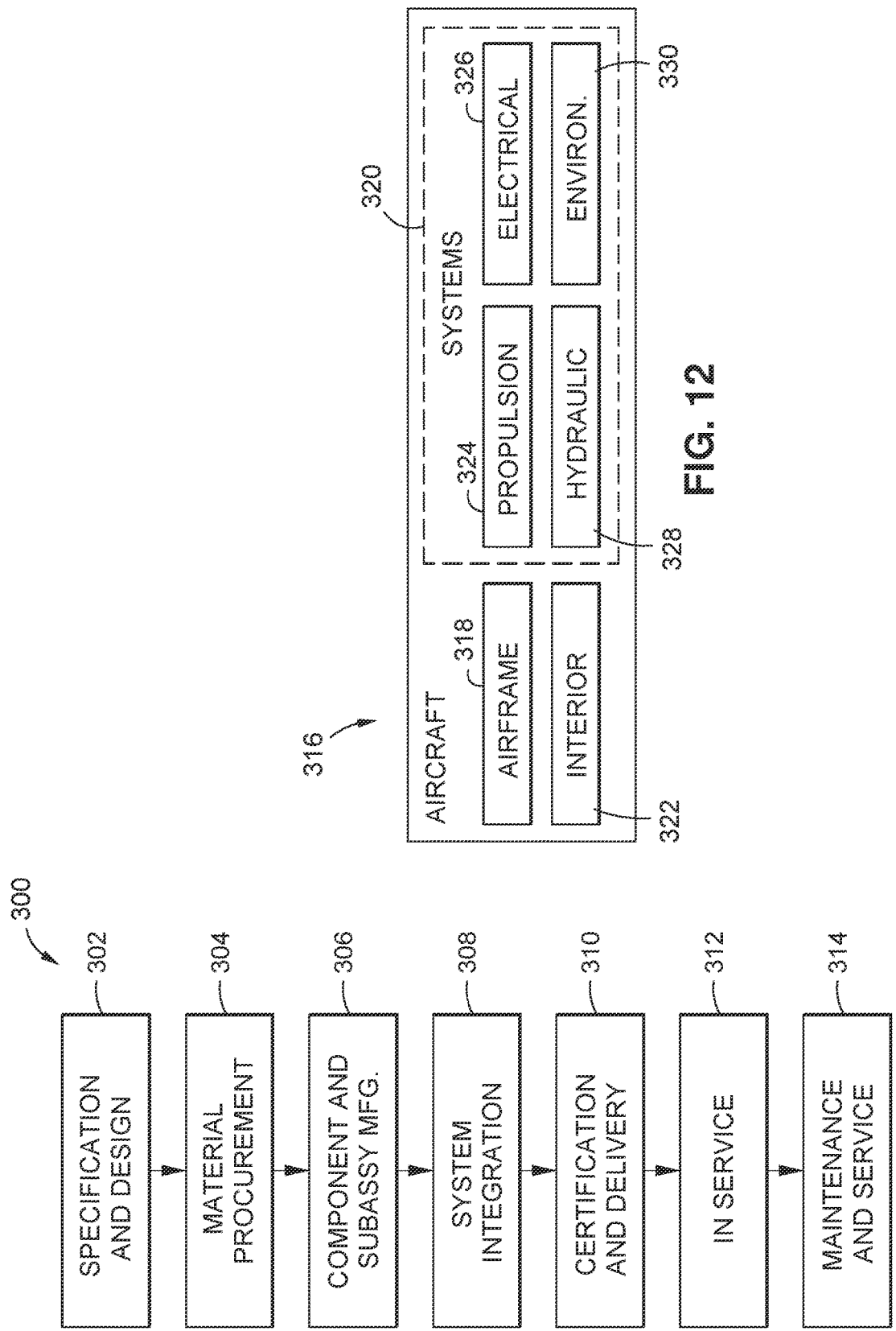
FIG. 11 is an illustration of a flow diagram of an exemplary aircraft manufacturing and service method.
FIG. 12 is an illustration of an exemplary block diagram of an aircraft.

Now referring to FIGS. 11 and 12, FIG. 11 is an illustration of a flow diagram of an exemplary aircraft manufacturing and service method 300, and FIG. 12 is an illustration of an exemplary block diagram of an aircraft 316. Referring to FIGS. 11 and 12, versions of the disclosure may be described in the context of the aircraft manufacturing and service method 300 as shown in FIG. 11, and the aircraft 316 as shown in FIG. 12.

During pre-production, exemplary aircraft manufacturing and service method 300 may include specification and design 302 of the aircraft 316 and material procurement 304.

During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 12, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry, the construction industry, or another suitable industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed versions of the tensioned tooling assembly 10 (see FIGS. 1, 6A), the tensioned tooling system 12 (see FIGS. 1, 6G), and the method 200 (see FIG. 10) provide a means to control and direct formation of wrinkles 8 (see FIG. 8) to specific areas, such as protruding areas 168 (see FIG. 8) that are configured or designed to be trimmed, cut, or removed from the formed thermoplastic composite part 156 (see FIG. 9A) having curved contours or angles, for example, the contoured curved flanged part 166 (see FIG. 9A), such as the aircraft contoured curved flanged part 166a (see FIG. 9A), for fuselage 222 (see FIG. 2), wings 224 (see FIG. 2), and other aircraft parts 157 (see FIG. 1), in the thermoplastic composite stamp forming process 14 (see FIG. 1), such as the thermoplastic composite hot stamp forming process 14a (see FIG. 1). This results in removal of the wrinkles 8 (see FIG. 8) in the net part 170 (see FIG. 9A), or the final formed part. The tensioned tooling assembly 10 (see FIG. 6A), an example of a tooling assembly, has the bottom tool 18 (see FIGS. 3A, 6A) with the tensioning protruding portions 40 (see FIG. 3A), or tensioning bump-out features, on the bottom tool outer flange (see FIG. 3A) of the bottom tool 18 (see FIG. 3A) that can be tailored or modified to adjust the amount of tension 167 (see FIG. 1) being applied to second portions 16c (see FIG. 6G) of the one or more thermoplastic composite charges 16 (see FIG. 6G) located adjacent to first portions 16b (see FIG. 6G). During the thermoplastic composite stamp forming process 14 (see FIG. 1), such as the thermoplastic composite hot stamp forming process 14a (see FIG. 1), the tensioning protruding portions 40, or tensioning bump-out features, in combination with the corresponding portions 116 (see FIGS. 4A, 6B) on the top tool 100 (see FIG. 4A), function to direct, push, and converge material bulk or ply waviness, or wrinkles 8 (see FIG. 6G) of the one or more thermoplastic composite charges 16 to the first portions 16b of the one or more thermoplastic composite charges 16. The first portions 16b (see FIG. 6G) with the excess material 178 (see FIG. 1) causing the wrinkles 8 (see FIG. 8) become the protruding areas 168 (see FIG. 8), or specific areas, with the wrinkles 8 (see FIG. 8) of the formed thermoplastic composite part 156 (see FIG. 8). The formed thermoplastic composite part 156 in the untrimmed form 160 (see FIG. 8) and the initial geometry 158a (see FIG. 8) then undergoes the material removal process 183 (see FIG. 1), such as trimming, cutting, or another suitable material removal process, with the material removal device 182 (see FIG. 1), such as a trimming device, a cutting device, or another suitable material removal device, to remove the protruding areas 168 with the wrinkles 8 from, for example, the flange 174 (see FIG. 8), such as the outer flange 17a (see FIG. 8) of the formed thermoplastic composite part 156 to obtain the wrinkle elimination 172 (see FIG. 1) in the net part 170 (see FIG. 9A). The net part 170 in the trimmed form 162 (see FIG. 9A) with the final geometry 158b (see FIG. 9A), in one version, may comprise the contoured curved flanged part 166 (see FIG. 9A), such as the aircraft contoured curved flanged part 166a (see FIG. 9A), without wrinkles 8 (see FIG. 8). Thus, the tensioning protruding portions 40 (see FIG. 3A), or tensioning bump-out features, in combination with the corresponding portions 116 (see FIGS. 4A, 6C) in the top tool 100, provide a means to control, direct, and push the material bulk or ply waviness causing the wrinkles 8 (see FIG. 6G), of the thermoplastic composite charge 16 material outwards to the first portions 16b (see FIG. 6G), which become the protruding areas 168 (see FIG. 8) of the formed thermoplastic composite part 156 (see FIG. 8), where the protruding areas 168 with the wrinkles 8 are trimmed, cut, or removed to obtain the net part 170 (see FIG. 9A), or final formed part, with, for example, the outer flange 174a (see FIG. 9A) that is wrinkle-free.

Disclosed versions of the tensioned tooling assembly 10 (see FIGS. 1, 6A), the tensioned tooling system 12 (see FIGS. 1, 6G), and the method 200 (see FIG. 10) provide a tooling concept configured to direct and move wrinkling in a stamped thermoplastic component to an area that will be removed, after forming is completed. The bottom tool 18 (see FIG. 3A) includes the tensioning protruding portions 40 (see FIG. 3A), or tensioning bump-out features, which in combination with the corresponding portions 116 in the top tool 100, apply tension 167 (see FIG. 1) to the second portions 16c (see FIG. 6G) of the one or more thermoplastic composite charges 16 during stamp forming, where the second portions 16c become the flange segments 192 (see FIG. 9A) that remain on the net part 170 (see FIG. 9A), or final formed part, after stamp forming and trimming, cutting, or material removal of the protruding areas 168 (see FIG. 8) with the wrinkles 8 (see FIG. 8). The material removal process 183 (see FIG. 1) using the material removal device 182 (see FIG. 1) to remove the protruding areas 168 and the wrinkles 8 results in wrinkle elimination 172 (see FIG. 1), for example, in the flange 174 (see FIG. 9A), such as the outer flange 174a (see FIG. 9A), of the net part 170, such as the contoured curved flanged part 166, and results in formation of the part cut-out portions 164 (see FIG. 9A), such as the mousehole shaped portions 165 (see FIG. 9A). The tensioning protruding portions 40 (see FIG. 3A), or tensioning bump-out features, may comprise integral tensioning protruding portions 40c (see FIG. 3A), or may comprise removable tensioning protruding portions 40d (see FIG. 6E), or may comprise a combination of integral tensioning protruding portions 40c and removable tensioning protruding portions 40d (see FIG. 6D), for optimizing the control and direction of the wrinkles 8 to the first portions 16b (see FIG. 6G) of the thermoplastic composite charge 16 (see FIG. 6G) during the thermoplastic composite stamp forming process 14 (see FIG. 1), such as the thermoplastic composite hot stamp forming process 14 (see FIG. 1).

The disclosed bottom tool 18 (see FIGS. 3A, 6A) of the disclosed tensioned tooling assembly 10 (see FIGS. 1, 6A) has the tensioning protruding portions 40 (see FIG. 3A), or tensioning bump-out features, which direct wrinkles 8 to the first portions 16b which are trimmed, cut, or removed to eliminate wrinkling in the net part 170, or final formed part, in the trimmed form 162 (see FIG. 9A) with the final geometry 158b (see FIG. 9A). Further, the disclosed top tool 100 (see FIGS. 4A, 6A) of the disclosed tensioned tooling assembly 10 (see FIGS. 1, 6A) has the corresponding portions 116 (see FIGS. 4A, 6C) that may comprise cut-out corresponding portions 122 (see FIG. 3A), or protruding corresponding portions 128 (see FIG. 6C) with a protruding shape 130 (see FIG. 6C), that correspond to the respective tensioning protruding portions 40 on the bottom tool 18.

Moreover, disclosed versions of the tensioned tooling assembly 10 (see FIGS. 1, 6A), the tensioned tooling system 12 (see FIGS. 1, 6G), and the method 200 (see FIG. 10) provide for removable tensioning protruding portions 40d (see FIG. 6E) that are removable and interchangeable. In one version, the one or more removable tensioning protruding portions 40d may be removably coupled, or attached, to the bottom tool outer curved surface 28 (see FIG. 6E), and/or to the bottom tool outer flange 20 (see FIG. 6E), or to another location on the bottom tool 18, via one or more attachment elements 46 (see FIGS. 1, 6D, 6E) comprising one of, one or more bolts 48 (see FIGS. 1, 6D, 6E), one or more screws 50 (see FIG. 1), one or more fasteners 52 (see FIG. 1), one or more clips 54 (see FIG. 1), or other suitable attachment elements. In another version, the one or more removable tensioning protruding portions 40d may be removably coupled, or attached, to the bottom tool outer curved surface 28, and/or to the bottom tool outer flange 20, or to another location on the bottom tool 18, via the slot and groove arrangement 56 (see FIG. 1), where the removable tensioning protruding portion 40d has one or more slot portions 58 (see FIG. 1) designed, or configured, to be inserted into one or more groove portions 60 (see FIG. 1) on the bottom tool 18.

Preferably, where the bottom tool 18 has removable tensioning protruding portions 40d (see FIG. 6E) that are removable and interchangeable, the top tool 100 (see FIG. 4A) similarly has removable corresponding portions 116c (see FIG. 1) corresponding to the respective removable tensioning protruding portions 40d. In one version, the one or more removable corresponding portions 116c may be removably coupled, or attached, to the top tool outer curved surface 108 (see FIG. 4A), or to the top tool outer flange 102 (see FIG. 4A), or to another location on the top tool 100, via the one or more attachment elements 46 (see FIG. 1) comprising one of, one or more bolts 48 (see FIG. 1), one or more screws 50 (see FIG. 1), one or more fasteners 52 (see FIG. 1), one or more clips 54 (see FIG. 1), or other suitable attachment elements. In another version, the one or more removable corresponding portions 116c may be removably coupled, or attached, to the top tool outer curved surface 108, or to the top tool outer flange 102, or to another location on the top tool 100, via the slot and groove arrangement 56 (see FIG. 1) where the removable corresponding portion 116c has one or more slot portions 58 (see FIG. 1) designed, or configured, to be inserted into one or more groove portions 60 (see FIG. 1) on the top tool 100.

In addition, disclosed versions of the tensioned tooling assembly 10 (see FIGS. 1, 6A), the tensioned tooling system 12 (see FIGS. 1, 6G), and the method 200 (see FIG. 10) provide for improved fabrication of contoured curved flanged parts 166, such as high contoured curved flanged parts and components, using thermoplastic composite charge 16 (see FIG. 5) material formed through the thermoplastic composite stamp forming process 14 (see FIG. 1), such as the thermoplastic composite hot stamp forming process 14a, with the thermoplastic composite stamp forming apparatus 175 (see FIGS. 1, 7), such as the thermoplastic composite fort stamp forming apparatus 175a (see FIGS. 1, 7). The thermoplastic composite stamp forming process 14 (see FIG. 1) and the thermoplastic composite stamp forming apparatus 175 are improved by incorporating a version of the tensioned tooling assembly 10 (see FIG. 1) disclosed herein having the bottom tool 18 with the tensioning protruding portions 40 (see FIG. 3A) and having the top tool 100 (see FIGS. 4A, 6C) with the corresponding portions 116 (see FIGS. 4A, 6C), to eliminate wrinkling caused by material bulk or ply waviness and reduction of the outer arc length 32c (see FIG. 5) of the one or more thermoplastic composite charges 16 (see FIG. 5) during the stamp formation of the one or more thermoplastic composite charges 16, to form the formed thermoplastic composite part 156 (see FIG. 8), where the wrinkles 8 (see FIG. 8) formed in the protruding areas 168 (see FIG. 8), for example, in the flange 174 (see FIG. 8), such as the outer flange 174a (see FIG. 8), are removed with the material removal process 183 to obtain the net part 170, such as the contoured curved flanged part 166 without wrinkles 8 (see FIG. 8) in the flange 174 (see FIG. 9A), such as the outer flange 174a (see FIG. 9A). Further, unlike thermoset materials, the thermoplastic composite material of the one or more thermoplastic composite charges 16 is able to withstand the high temperatures, e.g., 300 degrees Fahrenheit to 500 degrees Fahrenheit, of the thermoplastic composite hot stamp forming process 14a.

The tensioning protruding portions 40 on the bottom tool 18 allow the bottom tool 18, including the bottom tool outer flange 20 (see FIG. 3A) and the bottom tool outer curved surface 28 (see FIG. 3A), to have the bottom tool arc length 32a (see FIG. 3A) that matches the outer arc length 32c (see FIG. 5) of the thermoplastic composite charge 16 (see FIG. 5) that is flat prior to stamp forming. The tensioning protruding portions 40 on the bottom tool 18 are preferably tailored in size and shape and positioned at optimal locations along the bottom tool outer flange 20 (see FIG. 3A) based on a predetermined amount 176 (see FIG. 1) of the excess material 178 (see FIGS. 1, 8), such as an excess trim material, to be trimmed, cut, or removed from the flange 174 (see FIG. 8), such as the outer flange 174a (see FIG. 8), of the formed thermoplastic composite part 156 (see FIG. 8), after formation with the thermoplastic composite stamp forming process 14. The tensioning protruding portions 40 on the bottom tool 18 having matching features comprising the corresponding portions 116 on the top tool 100.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A tensioned tooling assembly for a thermoplastic composite stamp forming process, the tensioned tooling assembly comprising:
    a bottom tool comprising:
        a bottom tool outer flange having a bottom end, a bottom tool outer radius, and a bottom tool outer curved surface having an arc length and disposed between the bottom end and the bottom tool outer radius; and
        a plurality of tensioning protruding portions spaced apart on, and outwardly extending from, the bottom tool outer curved surface of the bottom tool outer flange, each tensioning protruding portion defining an angle formed from the bottom tool outer radius to the bottom end of the bottom tool outer flange; and
    a top tool comprising:
        a top tool outer flange having a bottom end, a top tool outer radius, and a top tool outer curved surface disposed between the bottom end and the top tool outer radius; and
        a plurality of corresponding portions formed in, and spaced apart on, the top tool outer curved surface, the plurality of corresponding portions corresponding to the plurality of tensioning protruding portions, and wherein the plurality of corresponding portions comprise cut-out corresponding portions,
    wherein during the thermoplastic composite stamp forming process, the tensioned tooling assembly is used to press a thermoplastic composite charge between the bottom tool outer flange of the bottom tool and the top tool outer flange of the top tool, and the plurality of tensioning protruding portions are used to push first portions of the thermoplastic composite charge outwardly, causing wrinkles to form in the first portions which are removed after forming of a net part from the thermoplastic composite charge, and the plurality of tensioning protruding portions apply tension to second portions of the thermoplastic composite charge which remain after forming of the net part, resulting in elimination of the wrinkles in the net part.

2. The tensioned tooling assembly of claim 1, wherein the plurality of tensioning protruding portions have one or more varying widths.

3. The tensioned tooling assembly of claim 1, wherein the plurality of tensioning protruding portions are integrally formed with the bottom tool outer curved surface.

4. The tensioned tooling assembly of claim 1, wherein one or more of the plurality of tensioning protruding portions comprise one or more removable tensioning protruding portions.

5. The tensioned tooling assembly of claim 4, wherein the one or more removable tensioning protruding portions are removably attached to the bottom tool outer curved surface, via one or more attachment elements comprising one of, one or more bolts, one or more screws, one or more fasteners, or one or more clips.

6. The tensioned tooling assembly of claim 4, wherein the one or more removable tensioning protruding portions are removably coupled to the bottom tool outer curved surface, via a slot and groove arrangement.

7. The tensioned tooling assembly of claim 1, wherein the plurality of tensioning protruding portions allow the arc length of the bottom tool outer curved surface to match an outer arc length of the thermoplastic composite charge.

8. The tensioned tooling assembly of claim 1, wherein each of the plurality of cut-out corresponding portions has a U-shaped configuration.

9. The tensioned tooling assembly of claim 1, wherein the plurality of cut-out corresponding portions comprise first cut-out corresponding portions and second cut-out corresponding portions, where the first cut-out corresponding portions are larger in shape and size than the second cut-out corresponding portions.

10. A tensioned tooling system for a thermoplastic composite stamp forming process to eliminate wrinkles in a flange of a contoured curved flanged part, the tensioned tooling system comprising:
    a tensioned tooling assembly comprising:
        a bottom tool comprising:
            a bottom tool outer flange having a bottom end, a bottom tool outer radius, and a bottom tool outer curved surface having an arc length and disposed between the bottom end and the bottom tool outer radius; and
            a plurality of tensioning protruding portions spaced apart on, and outwardly extending from, the bottom tool outer curved surface of the bottom tool outer flange, each tensioning protruding portion defining an angle formed from the bottom tool outer radius to the bottom end of the bottom tool outer flange; and
        a top tool comprising:
            a top tool outer flange having a bottom end, a top tool outer radius, and a top tool outer curved surface disposed between the bottom end and the top tool outer radius; and
            a plurality of corresponding portions formed in, and spaced apart on, the top tool outer curved surface, the plurality of corresponding portions corresponding to the plurality of tensioning protruding portions, and wherein the plurality of corresponding portions comprise cut-out corresponding portions; and
    a thermoplastic composite charge having an outer arc length,
    wherein during the thermoplastic composite stamp forming process, the tensioned tooling assembly is used to press the thermoplastic composite charge between the bottom tool outer flange of the bottom tool and the top tool outer flange of the top tool, and the plurality of tensioning protruding portions are used to push first portions of the thermoplastic composite charge outwardly, causing the wrinkles to form in the first portions which are removed after forming of the contoured curved flanged part from the thermoplastic composite charge, and the plurality of tensioning protruding portions apply tension to second portions of the thermoplastic composite charge which remain after forming of the contoured curved flanged part, resulting in elimination of the wrinkles in the flange of the contoured curved flanged part.

11. The tensioned tooling system of claim 10, wherein the contoured curved flanged part comprises an aircraft contoured curved flanged part for one or more of, a fuselage, a wing, an empennage, a tail, a horizontal stabilizer, or a vertical stabilizer, of an aircraft.

12. The tensioned tooling system of claim 10, wherein the plurality of tensioning protruding portions are integrally formed with the bottom tool outer curved surface.

13. The tensioned tooling system of claim 10, wherein one or more of the plurality of tensioning protruding portions comprise one or more removable tensioning protruding portions, and wherein one or more of the plurality of corresponding portions correspond to the one or more removable tensioning protruding portions.

14. The tensioned tooling system of claim 10, wherein the plurality of tensioning protruding portions are tailored in size based on a predetermined amount of an excess trim material to be trimmed from the contoured curved flanged part after formation with the thermoplastic composite stamp forming process.

15. The tensioned tooling system of claim 10, wherein each of the plurality of cut-out corresponding portions has a U-shaped configuration.

16. A method of using a tensioned tooling system for a thermoplastic composite stamp forming process to eliminate wrinkles in a flange of a contoured curved flanged part, the method comprising the steps of:
providing the tensioned tooling system comprising:
a tensioned tooling assembly comprising:
a bottom tool comprising:
a bottom tool outer flange having a bottom end, a bottom tool outer radius, and a bottom tool outer curved surface having an arc length and disposed between the bottom end and the bottom tool outer radius; and
a plurality of tensioning protruding portions spaced apart on, and outwardly extending from, the bottom tool outer curved surface of the bottom tool outer flange, each tensioning protruding portion defining an angle formed from the bottom tool outer radius to the bottom end of the bottom tool outer flange; and
a top tool comprising:
a top tool outer flange having a bottom end, a top tool outer radius, and a top tool outer curved surface disposed between the bottom end and the top tool outer radius; and
a plurality of corresponding portions formed in, and spaced apart on, the top tool outer curved surface, the plurality of corresponding portions corresponding to the plurality of tensioning protruding portions, and wherein the plurality of corresponding portions comprise cut-out corresponding portions; and
a thermoplastic composite charge having an outer arc length;
using the tensioned tooling assembly to press the thermoplastic composite charge between the bottom tool outer flange of the bottom tool and the top tool outer flange of the top tool during the thermoplastic composite stamp forming process;
using the plurality of tensioning protruding portions to push first portions of the thermoplastic composite charge outwardly, causing the wrinkles to form in the first portions, and to apply tension to second portions of the thermoplastic composite charge during the thermoplastic composite stamp forming process;
forming the flange of the contoured curved flanged part from the thermoplastic composite charge during the thermoplastic composite stamp forming process; and
removing the first portions from the flange of the contoured curved flanged part, resulting in elimination of the wrinkles in the flange of the contoured curved flanged part.

17. The method of claim 16, wherein the thermoplastic composite stamp forming process comprises a thermoplastic composite hot stamp forming process using heat in a temperature range of 300 degrees Fahrenheit to 500 degrees Fahrenheit.

18. The method of claim 16, wherein the step of using the plurality of tensioning protruding portions to push the first portions of the thermoplastic composite charge outwardly further comprises, using the plurality of tensioning protruding portions to allow the arc length of the bottom tool outer curved surface of the bottom tool outer flange of the bottom tool to match the outer arc length of the thermoplastic composite charge.

19. The method of claim 16, wherein the step of forming the flange of the contoured curved flanged part further comprises, forming the flange of the contoured curved flanged part comprising an aircraft contoured curved flanged part for one or more of, a fuselage, a wing, an empennage, a tail, a horizontal stabilizer, or a vertical stabilizer, of an aircraft.

20. The method of claim 16, wherein the step of removing the first portions from the flange of the contoured curved flanged part further comprises, trimming the first portions with the wrinkles from the flange of the contoured curved flanged part, to obtain part cut-out portions each having a part cut-out width and a part cut-out height substantially corresponding to a width and a height of each respective plurality of tensioning protruding portions.

* * * * *